US008240195B2

(12) United States Patent
Ogiso et al.

(10) Patent No.: US 8,240,195 B2
(45) Date of Patent: Aug. 14, 2012

(54) ABNORMALITY DETECTION APPARATUS AND ABNORMALITY DETECTION METHOD FOR AIR/FUEL RATIO SENSOR

(75) Inventors: Takeo Ogiso, Toyota (JP); Hiroaki Tsuji, Miyoshi (JP); Keiko Okamoto, Toyota (JP); Yuya Yoshikawa, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 356 days.

(21) Appl. No.: 12/757,690

(22) Filed: Apr. 9, 2010

(65) Prior Publication Data

US 2010/0318282 A1 Dec. 16, 2010

(30) Foreign Application Priority Data

Jun. 10, 2009 (JP) ................................ 2009-139348

(51) Int. Cl.
*G01M 15/04* (2006.01)

(52) U.S. Cl. .................................................... 73/114.77

(58) Field of Classification Search ............... 73/114.32, 73/114.48, 114.77
See application file for complete search history.

(56) References Cited

U.S. PATENT DOCUMENTS 5,970,967 A * 10/1999 Uchikawa ..................... 123/688
6,136,169 A * 10/2000 Okamoto ...................... 204/401
7,293,557 B2 * 11/2007 Nakamura et al. ............ 123/688
2008/0154528 A1 * 6/2008 Iwazaki ........................ 702/100
2008/0189008 A1 * 8/2008 Iwazaki .......................... 701/29
2010/0186491 A1 * 7/2010 Shibata et al. ............. 73/114.72
2010/0318282 A1 * 12/2010 Ogiso et al. ................... 701/109
2010/0319667 A1 * 12/2010 Yoshikawa et al. ........... 123/690
2010/0324802 A1 * 12/2010 Ogiso et al. ................... 701/103

FOREIGN PATENT DOCUMENTS

JP A-10-18897 1/1998
JP A-11-351976 12/1999
JP A-2004-225684 8/2004
JP A-2005-30358 2/2005
JP A-2005-36742 2/2005
JP A-2005-121003 5/2005

* cited by examiner

*Primary Examiner* — Eric S McCall
(74) *Attorney, Agent, or Firm* — Oliff & Berridge, PLC

(57) ABSTRACT

An apparatus includes: an control portion that controls fluctuating the air/fuel ratio; a data acquisition portion that acquires a responsiveness parameter during change of output of the sensor between a rich peak to a lean peak; and a determination portion that determines presence/absence of abnormality of the sensor based on an abnormality criterion value and a data average. When the number of the acquired data becomes equal to or greater than a first number, if the number of the acquired data during a large intake-air-amount of an engine is greater than or equal to a second number, the determination portion determines the presence/absence of abnormality, or if the number of the acquired data during the large intake-air-amount is less than the second number, the determination portion does not determines that, but acquires the data until the number of the acquired data during the large intake-air-amount reaches the second number.

8 Claims, 14 Drawing Sheets

ABNORMALITY DETECTION APPARATUS AND ABNORMALITY DETECTION METHOD FOR AIR/FUEL RATIO SENSOR

INCORPORATION BY REFERENCE

The disclosure of Japanese Patent Application No. 2009-139348 filed on Jun. 10, 2009 including the specification, drawings and abstract is incorporated herein by reference in its entirety.

BACKGROUND OF THE INVENTION

1. Field of the Invention

The invention relates to an abnormality detection apparatus and an abnormality detection method for an air/fuel ratio sensor.

2. Description of the Related Art

An internal combustion engine for a motor vehicle or the like is provided with an air/fuel ratio sensor that outputs a signal that corresponds to the air/fuel ratio of the internal combustion engine on the basis of the oxygen concentration in exhaust gas, and also with an apparatus for determining the presence/absence of abnormality of the air/fuel ratio sensor, for example, an abnormality detection apparatus disclosed in Japanese Patent Application Publication No. 2005-121003 (JP-A-2005-121003).

In the abnormality detection apparatus of JP-A-2005-121003, the presence/absence of abnormality of the air/fuel ratio sensor is determined by the following procedures “1” to “3”. Firstly, as the process “1”, an active air/fuel ratio control in which the air/fuel ratio of the internal combustion engine is periodically fluctuated between the rich state and the lean state is performed. Next, as the process “2”, a parameter that corresponds to the responsiveness of the output of the air/fuel ratio sensor is found on the basis of the output of the sensor during the active air/fuel ratio control, and the parameter is acquired as data for detecting abnormality. Finally, as the process “3”, the presence/absence of abnormality of the air/fuel ratio sensor is determined on the basis of comparison between the acquired data and an abnormality criterion value. Incidentally, with regard to the processes “2” and “3”, in order to more accurately perform the determination as to the presence/absence of abnormality of the air/fuel ratio sensor, it is also possible to adopt a modification in which the foregoing acquisition of data is performed, and the presence/absence of abnormality of the air/fuel ratio sensor is determined on the basis of comparison between an average value of the acquired data and the abnormality criterion value.

Besides, for example, Japanese Patent Application Publication No. 2005-36742 (JP-A-2005-36742) discloses that a condition that the internal combustion engine is in a state in which the amount of intake air is large is set as a condition for monitoring the air/fuel ratio for the purpose of determining the presence/absence of abnormality regarding the output of the air/fuel ratio sensor. The condition that the internal combustion engine is in the large-amount-of-intake-air state is set because during the large-amount-of-intake-air state of the internal combustion engine, the influence of a breakage of the air/fuel ratio sensor or the like clearly appears in the output of the air/fuel ratio sensor. Therefore, if this condition is used as an execution condition for performing the process “2” in the determination as to the presence/absence of abnormality of the air/fuel ratio sensor, it becomes possible to more accurately perform the determination as to the presence/absence of abnormality.

By setting the condition that the internal combustion engine is in the large-amount-of-intake-air state as an execution condition for performing the process “2”, it becomes possible to more accurately perform the determination as to the presence/absence of abnormality of the air/fuel ratio sensor in the foregoing procedure “1” to “3”. However, corresponding to the setting of this condition, the opportunity of executing the process “2” becomes less, and therefore the opportunity of determining the presence/absence of abnormality of air/fuel ratio sensor also becomes less.

SUMMARY OF THE INVENTION

The invention provides an abnormality detection apparatus and an abnormality detection method for an air/fuel ratio sensor which is capable of restraining the reduction of the opportunity of executing the determination as to the presence/absence of abnormality of the air/fuel ratio sensor while accurately performing the determination as to the presence/absence of abnormality.

An abnormality detection apparatus for an air/fuel ratio sensor in accordance with a first aspect of the invention is an abnormality detection apparatus for an air/fuel ratio sensor that outputs a signal that corresponds to air/fuel ratio of an internal combustion engine based on oxygen concentration in exhaust gas of the internal combustion engine, the apparatus including: an air/fuel ratio control portion that performs an active air/fuel ratio control of periodically fluctuating the air/fuel ratio of the internal combustion engine between a rich state and a lean state; a data acquisition portion that acquires, as data for detecting abnormality, a parameter that corresponds to responsiveness during change of output of the air/fuel ratio sensor between a rich peak and a lean peak during the active air/fuel ratio control performed by the air/fuel ratio control portion; and an abnormality determination portion that determines presence/absence of abnormality of the air/fuel ratio sensor based on comparison between an abnormality criterion value and an average value of the data that have been obtained by performing acquisition of the data via the data acquisition portion a plurality of times, wherein: when the number of times the data has been acquired by the data acquisition portion becomes equal to or greater than a first set number, the abnormality determination portion executes determination as to the presence/absence of abnormality if the number of times the acquisition of the data at a time of large amount of intake air of the internal combustion engine has been performed by the data acquisition portion is greater than or equal to a second set number; and when the number of times the data has been acquired by the data acquisition portion becomes equal to or greater than a first set number, if the number of times the acquisition of the data at the time of large amount of intake air of the internal combustion engine has been performed by the data acquisition portion is less than the second set number, the abnormality determination portion does not execute the determination as to the presence/absence of abnormality, but continues to acquire the data until the number of times the data has been acquired by the data acquisition portion at the time of large amount of intake air of the internal combustion engine reaches the second set number.

According to the abnormality detection apparatus for an air/fuel ratio sensor in accordance with the first aspect, the determination as to the presence/absence of abnormality of the air/fuel ratio sensor is performed in the following procedure. That is, the active air/fuel ratio control is performed. Then, when the output of the air/fuel ratio sensor changes between the rich peak and the lean peak during the active air/fuel ratio control, a parameter that corresponds to the responsiveness of the change is found on the basis of the output, and is acquired as data for use for detecting abnormality. Then, when the number of acquisitions of data becomes equal to or greater than the first set number, the determination as to the presence/absence of abnormality of the air/fuel ratio sensor is executed on the basis of the comparison between the average value of the acquired data and the abnormality criterion value, provided that, of the number of acquisitions of data which is greater than or equal to the first set number, the number of times the acquisition of the data at the time of large amount of intake air of the internal combustion engine has been performed is greater than or equal to the second set number. On the other hand, if, of the number of times the data has been acquired which is greater than or equal to the first set number, the number of times the data has been acquired at the time of large amount of intake air of the internal combustion engine is less than the second set number, the determination as to the presence/absence of abnormality of the air/fuel ratio sensor is not executed, and the data continues to be acquired until the number of times the data has been acquired at the time of large amount of intake air of the internal combustion engine reaches the second set number. After that, when the number of times the data has been acquired at the time of large amount of intake air of the internal combustion engine reaches the second set number, the determination as to the presence/absence of abnormality of the air/fuel ratio sensor is executed in substantially the same manner as the foregoing manner.

Therefore, when the presence/absence of abnormality of the air/fuel ratio sensor is determined on the basis of the comparison between the average value of the acquired data and the abnormality criterion value, the average value is found by using data that includes the data acquired at least second set number of times during the large-amount-of-intake-air state of the internal combustion engine. Incidentally, the data acquired during the large-amount-of-intake-air state of the internal combustion engine is highly reliable data that precisely represents the influence of abnormality of the air/fuel ratio sensor if any abnormality occurs. This is because during the large-amount-of-intake-air state of the internal combustion engine, the amount of flow of exhaust gas also becomes large due to the large amount of intake air, and because the influence of abnormality of the air/fuel ratio sensor more easily appears in the output of the air/fuel ratio sensor. Since the average value is found using the highly reliable data, the determination as to the presence/absence of abnormality of the air/fuel ratio sensor based on comparison between the average value and the abnormality criterion values becomes accurate.

Besides, when the foregoing parameter is found and is acquired as data during the active air/fuel ratio control, the condition that the internal combustion engine is in the large-amount-of-intake-air state or the like is not set as a condition for executing the foregoing acquisition of data. Therefore, the reduction of the opportunities of executing the acquisition of data by a number of opportunities that corresponds to the setting of the condition is restrained, and the reduction of the opportunities of execution of the determination as to the presence/absence of abnormality of the air/fuel ratio sensor which is associated with the reduced opportunities of executing the acquisition of data is restrained. However, with regard to the execution of the determination as to the presence/absence of abnormality of the air/fuel ratio sensor, the condition that the number of acquisitions performed at the time of large amount of intake air of the internal combustion engine is greater than or equal to the second set number is used as a condition for executing the determination. Although such a condition is used as a condition for executing the determination as to the presence/absence of abnormality of the air/fuel ratio sensor, the opportunities of executing the determination as to the presence/absence of abnormality of the air/fuel ratio sensor increase as compared with the case where the acquisition of data is performed by using as an execution condition the condition that the internal combustion engine is in the large-amount-of-intake-air state, or the like.

As can be understood from the foregoing description, it becomes possible to restrain the reduction of the opportunities of executing the determination as to the presence/absence of abnormality of the air/fuel ratio sensor while accurately performing the determination as to the presence/absence of abnormality of the air/fuel ratio sensor.

An abnormality detection method for an air/fuel ratio sensor in accordance with a second aspect of the invention is an abnormality detection method for an air/fuel ratio sensor that outputs a signal that corresponds to air/fuel ratio of an internal combustion engine based on oxygen concentration in exhaust gas of the internal combustion engine, the method including: performing an active air/fuel ratio control of periodically fluctuating the air/fuel ratio of the internal combustion engine between a rich state and a lean state; acquiring, as data for detecting abnormality, a parameter that corresponds to responsiveness during change of output of the air/fuel ratio sensor between a rich peak and a lean peak during the active air/fuel ratio control performed; and determining presence/absence of abnormality of the air/fuel ratio sensor based on comparison between an abnormality criterion value and an average value of the data that have been obtained by performing acquisition of the data a plurality of times, wherein:

when the number of times the data has been acquired becomes equal to or greater than a first set number, determination as to the presence/absence of abnormality is executed if the number of times the acquisition of the data at a time of large amount of intake air of the internal combustion engine has been performed is greater than or equal to a second set number; and when the number of times the data has been acquired becomes equal to or greater than the first set number, if the number of times the acquisition of the data at the time of large amount of intake air of the internal combustion engine has been performed is less than the second set number, the determination as to the presence/absence of abnormality is not executed, but the data continues to be acquired until the number of times the data has been acquired at the time of large amount of intake air of the internal combustion engine reaches the second set number.

The abnormality detection method for an air/fuel ratio sensor in accordance with the second aspect of the invention achieves substantially the same effect as the abnormality detection apparatus for an air/fuel ratio sensor in accordance with the first aspect.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

Hereinafter, a first embodiment in which the invention is embodied in an abnormality detection apparatus for an air/fuel ratio sensor provided in a motor vehicle engine will be described with reference to FIG. 1 to FIG. 8.

Figure 1:
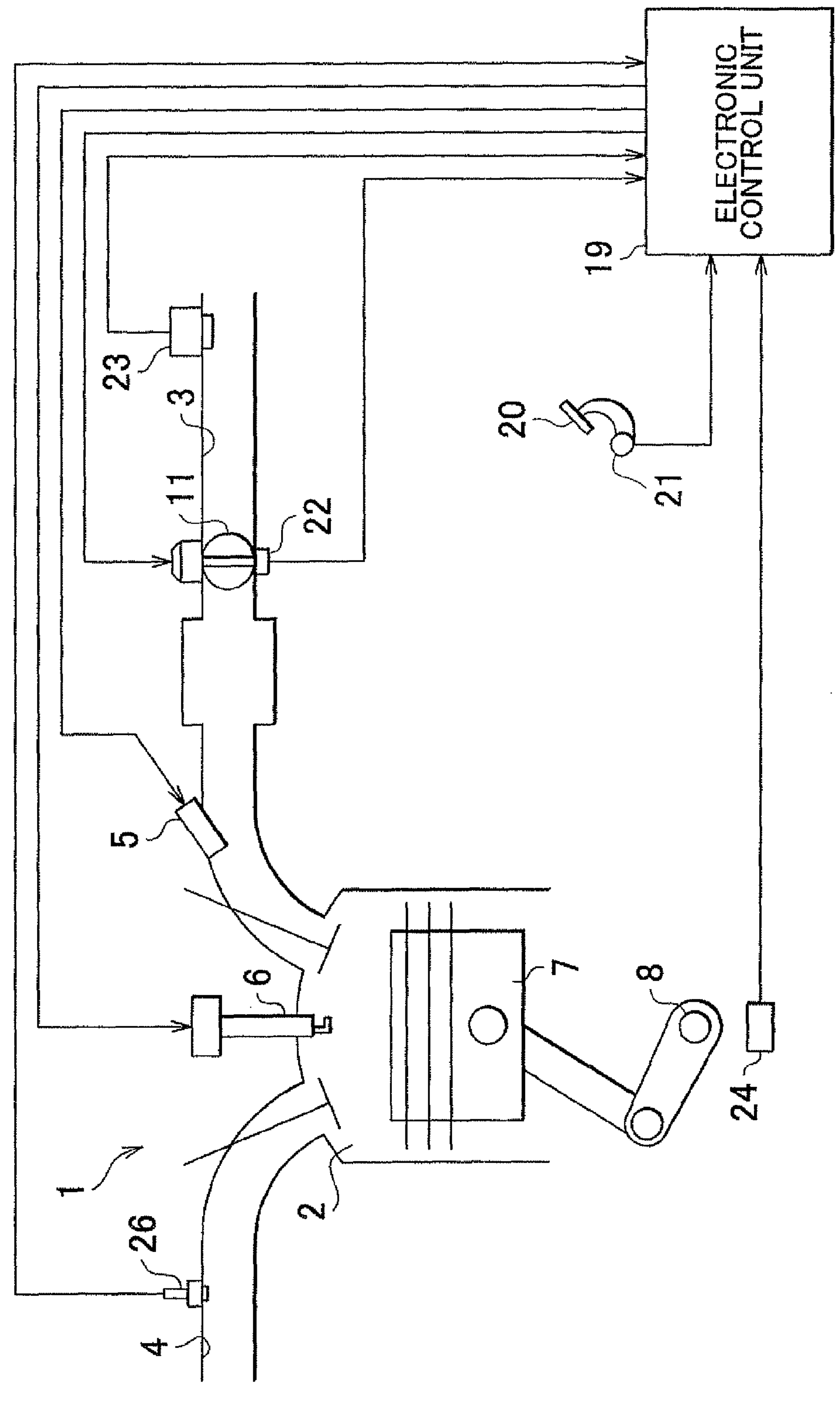
FIG. 1 is a simplified diagram showing the entire engine to which an abnormality detection apparatus for an air/fuel ratio sensor in accordance with each embodiment of the invention.

In an engine 1 shown in FIG. 1, an intake passageway 3 and an exhaust passageway 4 are connected to a combustion chamber 2 of each cylinder. The combustion chamber 2 of each cylinder is charged with a mixture made of air and fuel as air is taken into the combustion chamber 2 via the intake passageway 3 that is provided with a throttle valve 11 for adjusting the amount of intake air of the engine 1 and the fuel is supplied into the intake passageway 3 by injection from a fuel injection valve 5. When the mixture burns on the basis of ignition by an ignition plug 6 of each cylinder, the combustion energy produced at that time moves a piston 7 back and forth, so that a crankshaft 8 that is the output shaft of the engine 1 is rotated. Besides, the post-combustion mixture is sent out as exhaust gas into the exhaust passageway 4.

The motor vehicle in which the engine 1 is mounted as a prime mover is provided with an electronic control unit (ECU) 19 that executes various controls such as an operation control of the engine 1, etc. This electronic control unit 19 includes a CPU that executes various computations and processes related to the various controls, a ROM that stores programs and data needed for the controls, a RAM that temporarily stores results of the computations performed by the CPU, and the like, input/output ports for inputting signals from and outputting signals to external devices, etc.

Various sensors and the like as mentioned below are connected to the input ports of the electronic control unit 19. The various sensors include an accelerator pedal position sensor 21 that detects the amount of depression of an accelerator pedal 20 that is depressed by a driver of the motor vehicle (accelerator pedal depression amount), a throttle position sensor 22 that detects the degree of opening of the throttle valve 11 provided in the intake passageway 3 of the engine 1 (throttle opening degree), an air flow meter 23 that detects the amount of air taken into the combustion chamber 2 of each cylinder through the intake passageway 3, a crank position sensor 24 that outputs a signal that corresponds to the rotation of the crankshaft 8, and an air/fuel ratio sensor 26 that is provided in the exhaust passageway 4 and outputs a signal commensurate with the oxygen concentration in exhaust gas of the engine 1.

Besides, the drive circuits of various appliances, such as the fuel injection valves 5, the ignition plugs 6, the throttle valve 11, etc., are connected to the output ports of the electronic control unit 19. The electronic control unit 19 outputs command signals to the drive circuits of the various appliances connected to the output ports, according to the state of operation of the engine 1 that is grasped by the detection signals input from the various sensors. In this manner, the electronic control unit 19 executes various controls such as an ignition timing control of the ignition plugs 6, an opening degree control of the throttle valve 11, a control of the fuel injection via the fuel injection valves 5, etc.

An example of the control of the fuel injection via the fuel injection valves 5 is a fuel injection amount control that includes air/fuel ratio feedback correction of the amount of fuel injection. The air/fuel ratio feedback correction of the fuel injection amount is realized by increasing or decreasing an air/fuel ratio feedback correction value FD for correcting the fuel injection amount on the basis of the output VAF of the air/fuel ratio sensor 26 and the like so that the air/fuel ratio of the engine 1 becomes equal to a stoichiometric air/fuel ratio, and then by performing the correction with the air/fuel ratio feedback correction value FD. By controlling the air/fuel ratio of the engine 1 to the stoichiometric air/fuel ratio through the air/fuel ratio feedback correction, it becomes possible to maintain good performance of exhaust purification of exhaust purification catalysts provided in the exhaust passageway 4 of the engine 1 and therefore better the exhaust emission of the engine 1.

Figure 2:
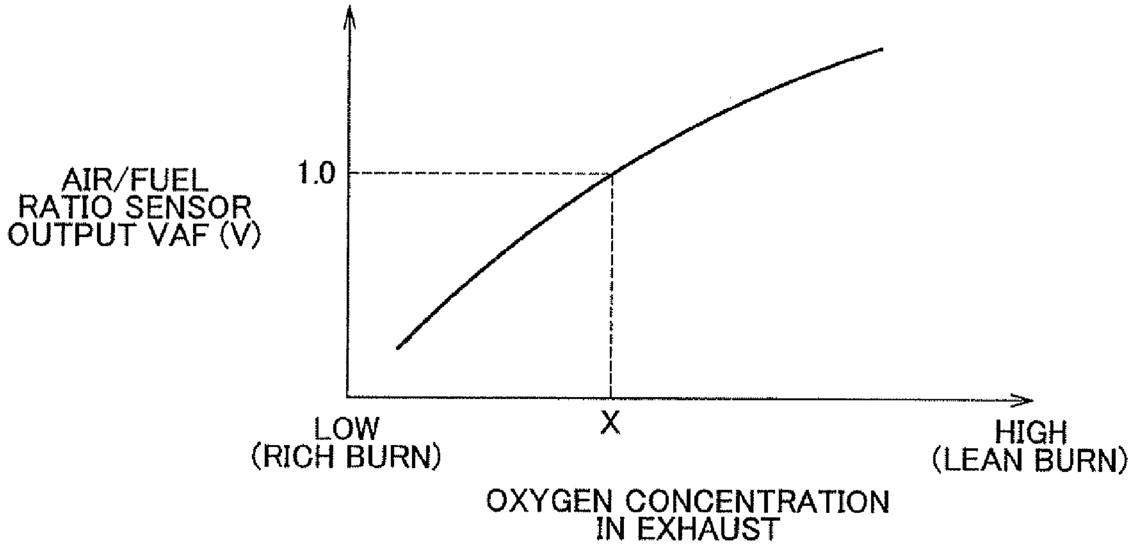
FIG. 2 is a graph showing changes of the output of the air/fuel ratio sensor relative to changes in the oxygen concentration in exhaust gas in various embodiments of the invention.

The output VAF of the air/fuel ratio sensor 26 becomes smaller the lower the oxygen concentration in exhaust gas becomes, as shown in FIG. 2. When the mixture is burned at the stoichiometric air/fuel ratio, the output VAF of the air/fuel ratio sensor 26 becomes, for example, "1.0 V", corresponding to the then oxygen concentration X in exhaust gas. Therefore, the lower the oxygen concentration in exhaust gas becomes due to combustion of rich mixture (rich combustion), the smaller the output VAF of the air/fuel ratio sensor 26 becomes in the range below "1.0 V". Besides, the higher the oxygen concentration in exhaust gas becomes due to combustion of lean mixture (lean combustion), the greater the output VAF of the air/fuel ratio sensor 26 becomes in the range above "1.0 V". Then, as the output VAF of the air/fuel ratio sensor 26 becomes greater in the range above "1.0", the air/fuel ratio feedback correction value FD is gradually increased so as to increase the amount of fuel injection of the engine 1. Besides, as the output VAF of the air/fuel ratio sensor 26 becomes smaller in the range below "1.0", the air/fuel ratio feedback correction value FD is gradually reduced so as to reduce the amount of fuel injection of the engine 1. By correcting the amount of fuel injection of the engine 1 in the increasing or decreasing direction on the basis of the air/fuel ratio feedback correction value FD that changes in the foregoing manner, the air/fuel ratio of the engine 1 is controlled to the stoichiometric air/fuel ratio.

Next, an abnormality detection process for determining the presence/absence of abnormality of the air/fuel ratio sensor 26 which is performed via the electronic control unit 19 will be described. This abnormality detection process is performed in, for example, the following procedure "a" to "c".

Figure 3:
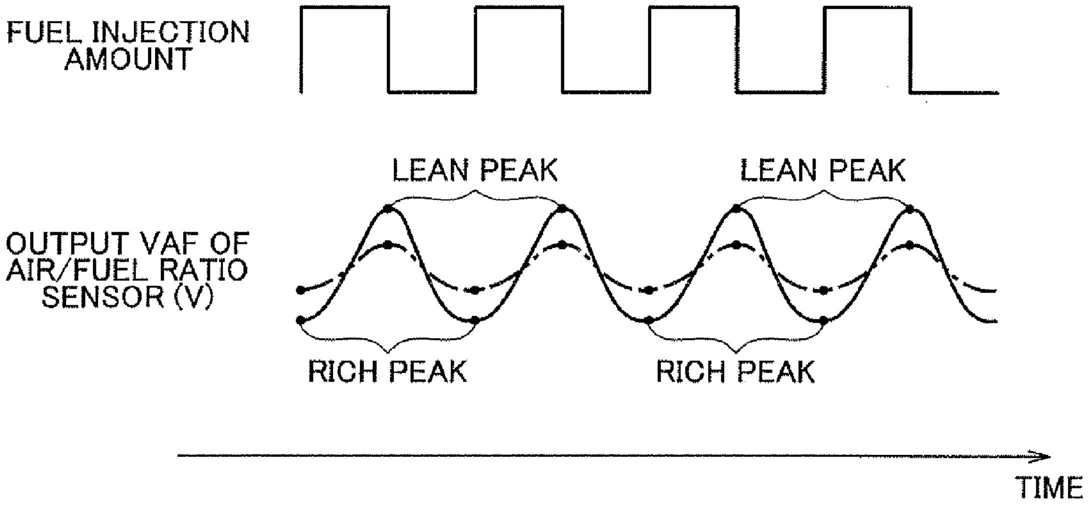
FIG. 3 is a time chart showing the fashion of increases and decreases of the amount of fuel injection during the active air/fuel ratio control, and the fashion of changes of the output of the air/fuel ratio sensor, in accordance with various embodiments of the invention.

Firstly, in the process "a", an active air/fuel ratio control of periodically fluctuating the air/fuel ratio of the engine 1 between a rich state in which the air/fuel ratio is richer than the stoichiometric air/fuel ratio and a lean state in which the air/fuel ratio is leaner than the stoichiometric air/fuel ratio by periodically increasing and decreasing the amount of fuel injection of the engine 1 as shown, for example, in FIG. 3, is performed. Incidentally, the amount of change of the air/fuel ratio relative to the stoichiometric air/fuel ratio when the air/fuel ratio of the engine 1 is fluctuated by the active air/fuel ratio control is set at, for example, about 3% of the stoichiometric air/fuel ratio to the rich side and the lean side from the stoichiometric air/fuel ratio.

Next, in the process "b", a parameter that corresponds to the responsiveness of the output of the air/fuel ratio sensor 26 (hereinafter, referred to as "responsiveness parameter") during the active air/fuel ratio control is found on the basis of the output VAF of the air/fuel ratio sensor 26 during the active air/fuel ratio control, and the found parameter is acquired as data for detecting abnormality. Incidentally, the acquisition of data in this manner is able to be repeatedly performed, and therefore the acquisition of data as described above is performed a plurality of times to acquire a plurality of data.

Finally, in the process "c", the presence/absence of abnormality of the air/fuel ratio sensor 26 is determined on the basis of comparison between the average value of the acquired data and an abnormality criterion value. Due to determination as to the presence/absence of abnormality of the air/fuel ratio sensor 26 through the use of the average value in this manner, even if there is variation among the plurality of data due to variations of the operation of the engine 1, the influence that the variation among the data has on the determination as to the presence/absence of abnormality is restrained.

Herein, if a condition that the engine 1 is in a state of large amount of intake air is set as the execution condition for performing the process "b", it becomes possible to even more accurately perform the determination as to the presence/absence of abnormality of the air/fuel ratio sensor 26 on the basis of the procedure "a" to "c".

The reason for this is related to that in the large-amount-of-intake-air state of the engine 1, the exhaust gas pressure of the engine 1 (corresponding to the amount of flow of exhaust gas) rises, and the gas exchange between inside a sensor cover of the air/fuel ratio sensor 26 on which a detector element is present and outside the sensor cover (exhaust passageway 4) is accelerated. Thus, the gas exchange between inside and outside the sensor cover is accelerated, the influence of abnormality of the air/fuel ratio sensor 26 clearly appears in the output of the air/fuel ratio sensor 26, and the parameter found on the basis of the output of the air/fuel ratio sensor 26 is acquired as highly reliable data in the process "b". In consequence, it becomes possible to accurately perform the determination as to the presence/absence of abnormality of the air/fuel ratio sensor 26 on the basis of the procedure "a" to "c".

Incidentally, if the process "b" is executed without the execution condition that the engine 1 is in the large-amount-of-intake-air state, data with low reliability due to a small-amount-of-intake-air state of the engine 1 may be acquired a plurality of times, and therefore there is possibility of failing to accurately perform the determination as to the presence/absence of abnormality of the air/fuel ratio sensor 26 in the process "c" through the use of the average value of data that include such low-reliability data. Furthermore, during an accelerating travel of the motor vehicle in the small-amount-of-intake-air state of the engine 1, the responsiveness parameter greatly fluctuates due to the response delay of various appliances related to the engine 1, so that the data acquired in the process "b" is highly likely to be a low-reliability value that makes it less easy to determine the presence/absence of abnormality of the air/fuel ratio sensor 26. Due to this, too, if the process "b" is executed without the execution condition that the engine 1 is in the large-amount-of-intake-air state, the possibility of failing to accurately perform the determination as to the presence/absence of abnormality of the air/fuel ratio sensor 26 in the process "c" becomes high. However, if the condition that the engine 1 is in the large-amount-of-intake-air state is set as the execution condition for the process "b", the occurrence of the foregoing drawback can be avoided.

However, if the condition that the engine 1 is in the large-amount-of-intake-air state is set as an execution condition for performing the process "b", the opportunities of executing the process "b" correspondingly decrease, and therefore the opportunities of determining the presence/absence of abnormality of the air/fuel ratio sensor 26 on the basis of the procedure "a" to "c" also decrease.

Figure 4:
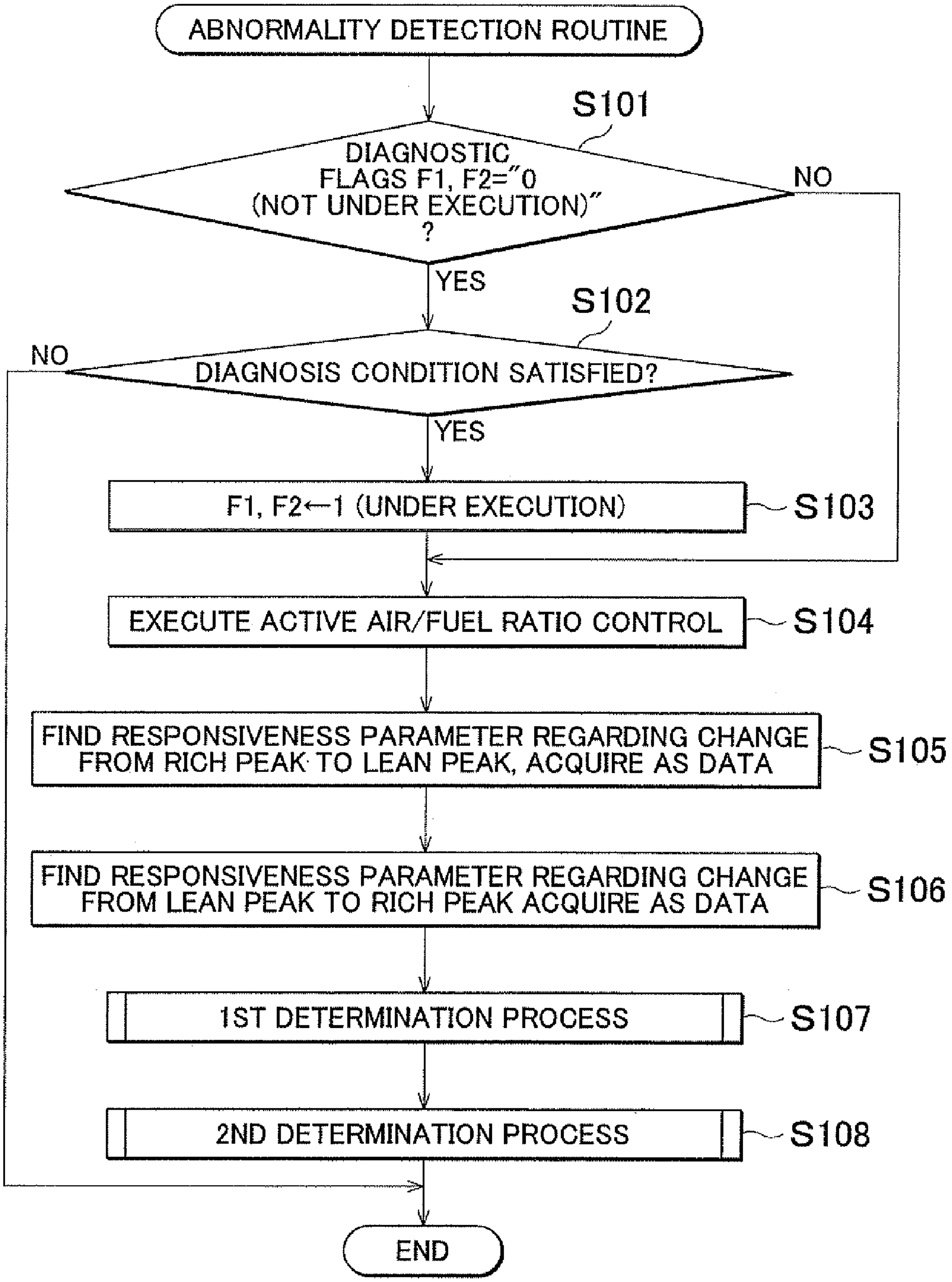
FIG. 4 is a flowchart showing an execution procedure of a abnormality detection process for determining the presence/absence of abnormality of the air/fuel ratio sensor in various embodiments of the invention.

FIG. 4 is a flowchart showing an abnormality detection process routine for executing the abnormality detection process of this embodiment that is intended to cope with the foregoing drawbacks. Through the execution of this abnormality detection process, the determination as to the presence/absence of abnormality of the air/fuel ratio sensor 26 is accurately performed, and the foregoing drawback of decrease of the opportunities of executing the determination process is mitigated. The abnormality detection process routine is periodically executed by, for example, a time interrupt at every predetermined time, via the electronic control unit 19. Incidentally, in the abnormality detection process routine shown in FIG. 4, the process of steps S101 to S104 corresponds to the process "a", and the process of steps S105 and S106 corresponds to the process "b", and the process of steps S107 and S108 corresponds to the process "c".

The procedure of the processes "a" to "c" related to the abnormality detection process of this embodiment will be described in detail below. Firstly, the process "a" (S101 to S104) will be described. In the series of processes of steps S101 to S104, it is determined whether or not diagnostic flags F1 and F2 for determining whether or not the abnormality detection process of determining the presence/absence of abnormality of the air/fuel ratio sensor 26 is being executed are both "0 (not under execution)" (S101). If an affirmative determination is made in this step, it is determined whether or not a diagnosis condition that is a prerequisite condition for executing the abnormality detection process is satisfied (S102). The determination that the diagnosis condition is satisfied is made upon satisfaction of all conditions, including the condition that the engine rotation speed and the engine load are within such a region that the abnormality detection process can be executed, the condition that the fluctuations of the engine load are less than a permissible level, etc. Incidentally, the engine rotation speed is found on the basis of the detection signal from the crank position sensor 24. Besides, the engine load is calculated from the engine rotation speed, and a parameter that corresponds to the intake air amount of the engine 1. Examples of the parameter corresponding to the intake air amount which is used as described above include an actually measured value of the amount of air taken into the engine 1 which is found on the basis of the detection signal from the air flow meter 23, the throttle opening degree detected by the throttle position sensor 22, etc. If in step S102 it is determined that the diagnosis condition is satisfied, the diagnostic flags F1 and F2 are both set to "1 (under execution)" (S103), and the foregoing active air/fuel ratio control is executed (S104). On the other hand, if in step S102 it is determined that the diagnosis condition is not satisfied, the abnormality detection process routine is ended.

Next, the process "b" (S105 and S106) will be described. In the process of step S105, a responsiveness parameter for the period during which the output VAF of the air/fuel ratio sensor 26 changes from a rich peak to a lean peak during the active air/fuel ratio control is found, and the found responsiveness parameter is acquired as data. On the other hand, in the process of step S106, a responsiveness parameter for the period during which the output VAF of the air/fuel ratio sensor 26 changes from a lean peak to a rich peak during the active air/fuel ratio control is found, and the found responsiveness parameter is acquired as data.

The responsiveness parameter used herein may be a maximum value θmax of the gradient θ of the output VAF of the air/fuel ratio sensor 26 while the output VAF of the air/fuel ratio sensor 26 changes between the rich peak and the lean peak. The gradient θ of the output VAF of the air/fuel ratio sensor 26 is a value that represents change of the output VAF of the air/fuel ratio sensor 26 per unit time, and is calculated in the following manner. That is, the output VAF of the air/fuel ratio sensor is taken at every predetermined time interval Δt during the period of the change between the rich peak and the lean peak, and at every one of such take-up, the gradient θ is calculated using the following expression.

$$\theta = (\text{present } VAF - \text{previous } VAF)/\Delta t \quad (1)$$

Hence, when the change of the output VAF of the air/fuel ratio sensor 26 from the rich peak to the lean peak is completed, the then maximum value θmax (maximum value in a positive direction) of the gradient θ of the output VAF of the air/fuel ratio sensor 26 during the time from the rich peak to the lean peak is determined. Then, the maximum value θmax of the gradient θ of the output VAF of the air/fuel ratio sensor 26 is acquired as data that corresponds to the responsiveness parameter used for the time from the rich peak to the lean peak (S105). More specifically, the maximum value θmax of the gradient θ of the output VAF of the air/fuel ratio sensor 26 is stored into the RAM of the electronic control unit 19. The storage of the maximum value θmax in this manner is performed every time the change of the output VAF of the air/fuel ratio sensor 26 from the rich, peak to the lean peak is completed during the active air/fuel ratio control.

Besides, when the change of the output VAF of the air/fuel ratio sensor 26 from the lean peak to the rich peak is completed, the maximum value θmax (maximum value in the negative direction) of the gradient θ of the output VAF of the air/fuel ratio sensor 26 during the time from the lean peak to the rich peak is determined. Then, the maximum value θmax of the gradient θ of the output VAF of the air/fuel ratio sensor 26 is acquired as data that corresponds to the responsiveness parameter used for the time from the lean peak to the rich peak (S106). More specifically, the maximum value θmax of the gradient θ of the output VAF of the air/fuel ratio sensor 26 is stored into the RAM of the electronic control unit 19. The storage of the maximum value θmax in this manner is performed every time the change of the air/fuel ratio sensor 26 from the lean rich peak to the rich peak is completed during the active air/fuel ratio control.

Figure 5:
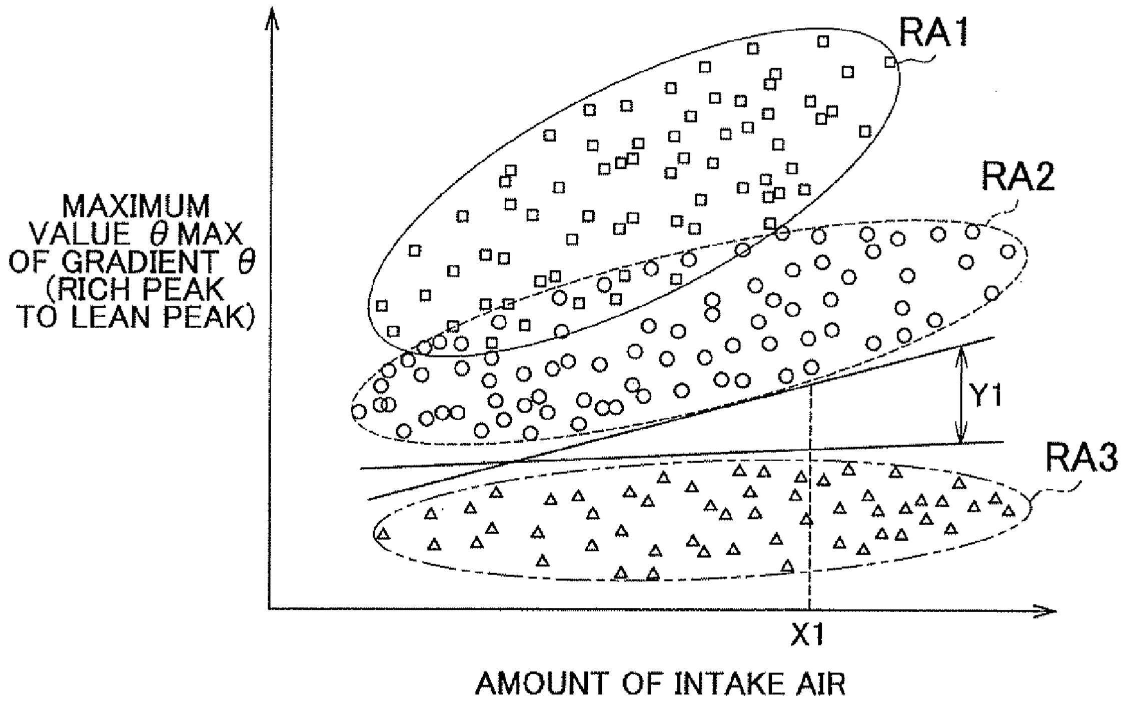
FIG. 5 is a distribution diagram showing the distribution of the maximum value θmax of the gradient θ acquired as data of the responsiveness parameter when the output of the air/fuel ratio sensor changes from a rich peak to a lean peak during the active air/fuel ratio control in various embodiments of the invention.

FIG. 5 shows the distribution of the maximum values θmax acquired as data of the responsiveness parameter when the output VAF of the air/fuel ratio sensor 26 changes from the rich peak to the lean peak. In the diagram of FIG. 5, a symbol "◎"indicates the data acquired when the air/fuel ratio sensor 26 is normal, and a symbol "○" indicates the data acquired when the air/fuel ratio sensor 26 is normal but in an lower-limit permissible state in conjunction with abnormality, and a symbol "Δ" indicates data acquired when the air/fuel ratio sensor 26 is in an abnormal state due to degradation or the like of the air/fuel ratio sensor 26.

A region RA1 in which data indicated by "◎"are distributed is located above (in the diagram) a region RA2 in which data indicated by "○" are distributed, and the region RA2 is located above (in the diagram) a region RA3 in which data indicated by the "Δ" are distributed. This data distribution results because if the air/fuel ratio sensor 26 has abnormality such as degradation or the like, the responsiveness of the output VAF of the air/fuel ratio sensor 26 during the active air/fuel ratio control deteriorates as shown by a dashed two-dotted line in the time chart of the output VAF of the air/fuel ratio sensor 26 shown in FIG. 3 from a normal state (shown by a solid line in the time chart), and the influence thereof appears in the distribution of data in FIG. 5. Besides, the regions RA1, RA2 and RA3 are displaced upward in the diagram to an extent that is greater the greater the intake air amount of the engine 1. The degree of upward displacement of the regions in the diagram relative to the increase in the intake air amount becomes larger in the order of the region RA3, the region RA2 and the region RA1. This is because as the intake air amount of the engine 1 increases, the exhaust gas pressure of the engine 1 (that corresponds to the amount of flow of exhaust gas) rises, and the responsiveness of the output VAF of the air/fuel ratio sensor 26 to the change in the actual air/fuel ratio of the engine 1 improves, and because the improvement in the responsiveness is large when the air/fuel ratio sensor 26 is normal, and is small when the air/fuel ratio sensor 26 is abnormal.

Figure 6:
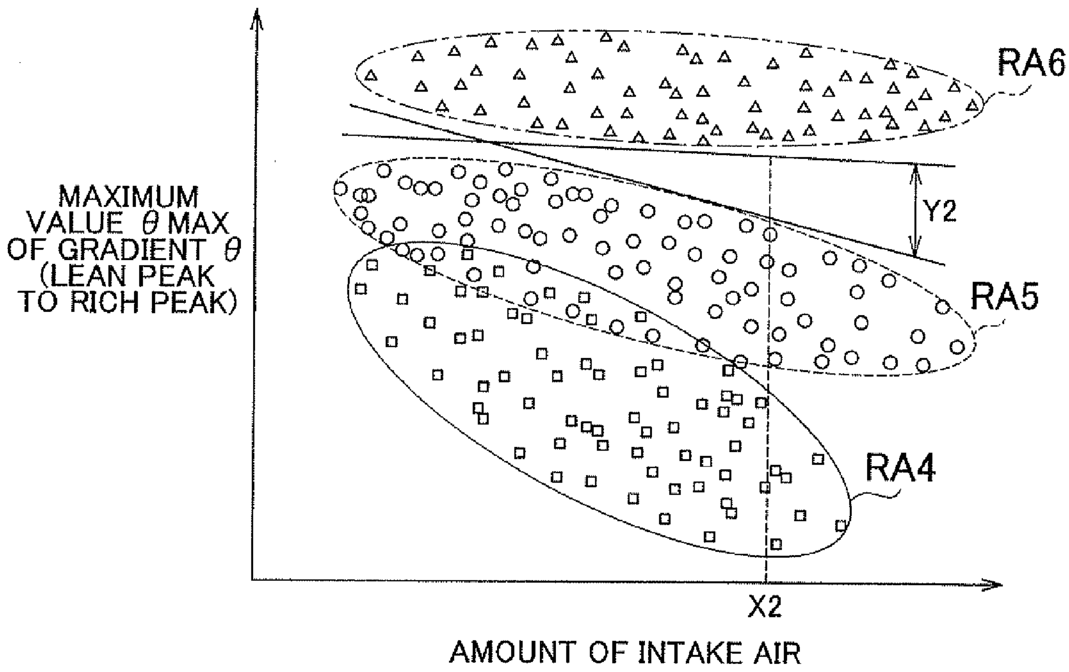
FIG. 6 is a distribution diagram showing the distribution of the maximum value θmax of the gradient θ acquired as data of the responsiveness parameter when the output of the air/fuel ratio sensor changes from the lean peak to the rich peak during the active air/fuel ratio control in various embodiments of the invention.

FIG. 6 is a diagram showing the distribution of the maximum values θmax that are acquired as data for the responsiveness parameter when the output VAF of the air/fuel ratio sensor 26 changes from the lean peak to the rich peak. Incidentally, in this diagram of FIG. 6, a symbol "◎"indicates the data acquired when the air/fuel ratio sensor 26 is normal, and a symbol "○" indicates the data acquired when the air/fuel ratio sensor 26 is normal but in an lower-limit permissible state in conjunction with abnormality, and a symbol "Δ" indicates data acquired when the air/fuel ratio sensor 26 is in an abnormal state of the air/fuel ratio sensor 26, as in FIG. 5.

A region RA4 in which data indicated by "◎"are distributed is located below (in the diagram) a region RA5 in which data indicated by "○" are distributed, and the region RA5 is located below (in the diagram) a region RA6 in which data indicated by the "Δ" are distributed. This data distribution results because if the air/fuel ratio sensor 26 has abnormality such as degradation or the like, the responsiveness of the output VAF of the air/fuel ratio sensor 26 during the active air/fuel ratio control deteriorates as shown by the dashed two-dotted line in the time chart of the output VAF of the air/fuel ratio sensor 26 shown in FIG. 3 from a normal state (shown by the solid line in the time chart), and the influence thereof appears in the distribution of data in FIG. 6. Besides, the regions RA4, RA5 and RA6 are displaced downward in the diagram to an extent that is greater the greater the intake air amount of the engine 1. The degree of downward displacement of the regions in the diagram relative to the increase in the intake air amount becomes larger in the order of the region RA6, the region RA5 and the region RA4. This is because as the intake air amount of the engine 1 increases, the exhaust gas pressure of the engine 1 (that corresponds to the amount of flow of exhaust gas) rises, and the responsiveness of the output VAF of the air/fuel ratio sensor 26 to the change in the actual air/fuel ratio of the engine 1 improves, and because the improvement in the responsiveness is large when the air/fuel ratio sensor 26 is normal, and is small when the air/fuel ratio sensor 26 is abnormal.

Finally, in the process "c" (S107 and S108), step S107 (FIG. 4) is a process for determining the presence/absence of abnormality of the air/fuel ratio sensor 26 when the output VAF of the air/fuel ratio sensor 26 changes from the rich state to the lean state (hereinafter, referred to as "first determination process"). The first determination process uses the data (maximum values θmax) acquired when the output VAF of the air/fuel ratio sensor 26 changes from the rich peak to the lean peak during the active air/fuel ratio control. Specifically, the number N1 of acquisitions of the foregoing data performed after the active air/fuel ratio control has started is counted. Then, when the number N1 of acquisitions of the data becomes equal to or greater than a first set number S (of acquisitions), the average value AV1 of the acquired data is found and the determination as to the presence/absence of abnormality of the air/fuel ratio sensor 26 based on comparison between the average value AV1 and an abnormality criterion value H1 is performed provided that, of the number of times the data has been acquired which is equal to or greater than the first set number S, a number N1*b* of acquisitions of the data performed during the large-amount-of-intake-air state of the engine 1 is greater than or equal to a second set number T (of acquisitions) (T<S). That is, if the average value AV1 is apart in the negative direction from the abnormality criterion value H1, it is determined that the air/fuel ratio sensor 26 has abnormality, and if not, it is determined that the air/fuel ratio sensor 26 is normal. After this determination as to the presence/absence of abnormality is performed, the diagnostic flag F1 used in step S101 is switched from "1 (under execution)" to "0 (not under execution)". Incidentally, while the diagnostic flag F1 is "1", a negative determination is made in step S101, and therefore the process of steps S102 and S103 is skipped, and the process of step S104 and later steps is executed. On the other hand, if the number N1*b* of acquisitions of the data performed during the large-amount-of-intake-air state of the engine 1 is less than the second set number T (of acquisitions), the determination as to the presence/absence of abnormality is prohibited and the foregoing acquisition of data is continued.

Step S108 in FIG. 4 is a process for determining the presence/absence of abnormality of air/fuel ratio sensor 26 when the output VAF of the air/fuel ratio sensor 26 changes from the lean state to the rich state (hereinafter, referred to as "second determination process"). This second determination process uses the data (maximum values θmax) acquired when the output VAF of the air/fuel ratio sensor 26 changes from the lean peak to the rich peak during the active air/fuel ratio control. Specifically, the number N2 of acquisitions of the data performed after the execution of the active air/fuel ratio control has started is counted. Then, when the number N2 of acquisitions of the data becomes equal to or greater than the first set number S, the average value AV2 of the acquired data is found and the determination as to the presence/absence of abnormality of the air/fuel ratio sensor 26 based on comparison between the average value AV2 and an abnormality criterion value H2 is performed provided that, of the data whose number is equal to or greater than the first set number S, a number N2*b* of acquisitions of the data performed during the large-amount-of-intake-air state of the engine 1 is greater than or equal to the second set number T (T<S). That is, if the average value AV2 is apart in the positive direction from the abnormality criterion value H2, it is determined that the air/fuel ratio sensor 26 has abnormality, and if not, it is determined that the air/fuel ratio sensor 26 is normal. After this determination as to the presence/absence of abnormality is performed, the diagnostic flag F2 used in step S101 is switched from "1 (under execution)" to "0 (not under execution)". Incidentally, while the diagnostic flag F2 is "1", a negative determination is made in step S101, and therefore the process of steps S102 and S103 is skipped, and the process of step S104 and later steps is executed. On the other hand, if the number N2*b* of acquisitions of the data performed during the large-amount-of-intake-air state of the engine 1 is less than the second set number T, the determination as to the presence/absence of abnormality is prohibited and the foregoing acquisition of data is continued.

In the abnormality detection process based on the procedure "a" to "c", the average values AV1 and AV2 used in the first and the second determination processes in the process "c" are found using data that include data acquired at least the second set number T of times during the large-amount-of-intake-air state of the engine 1. Incidentally, the data acquired during the large-amount-of-intake-air state of the engine 1 is highly reliable data that precisely represents the influence of an abnormality of the air/fuel ratio sensor 26 if any occurs. This is because during the large-amount-of-intake-air state of the engine 1, the amount of flow of exhaust gas also becomes large due to the large amount of intake air, and because the influence of the abnormality of the air/fuel ratio sensor 26 more easily appears in the output of the air/fuel ratio sensor 26. Since the average values AV1 and AV2 are found using the highly reliable data, the determination as to the presence/absence of abnormality of the air/fuel ratio sensor 26 based on comparison between the average values AV1 and AV2 and the abnormality criterion values becomes accurate.

Besides, in the process "b", when the maximum value θmax (responsiveness parameter) is found and is acquired as data during the active air/fuel ratio control, the condition that the engine 1 is in the large-amount-of-intake-air state or the like is not set as a condition for executing the foregoing acquisition of data. Therefore, the reduction of the opportunities of executing the acquisition of data by a number of opportunities that corresponds to the setting of the condition is restrained, and the reduction of the opportunities of execution of the determination as to the presence/absence of abnormality of the air/fuel ratio sensor 26 which is associated with the reduced opportunities of the acquisition of data is restrained. However, with regard to the execution of the determination as to the presence/absence of abnormality of the air/fuel ratio sensor 26 on the basis of the procedure "a" to "c", the condition that the number N2*b* of acquisitions is greater than or equal to the second set number T is used as a condition for executing the determination. Although such a condition is used as a condition for executing the determination as to the presence/absence of abnormality of the air/fuel ratio sensor 26, the opportunities of executing the determination as to the presence/absence of abnormality of the air/fuel ratio sensor 26 increase as compared with the case where the acquisition of data in the process "b" is performed by using as an execution condition the condition that the engine 1 is in the large-amount-of-intake-air state, or the like.

Figure 7:
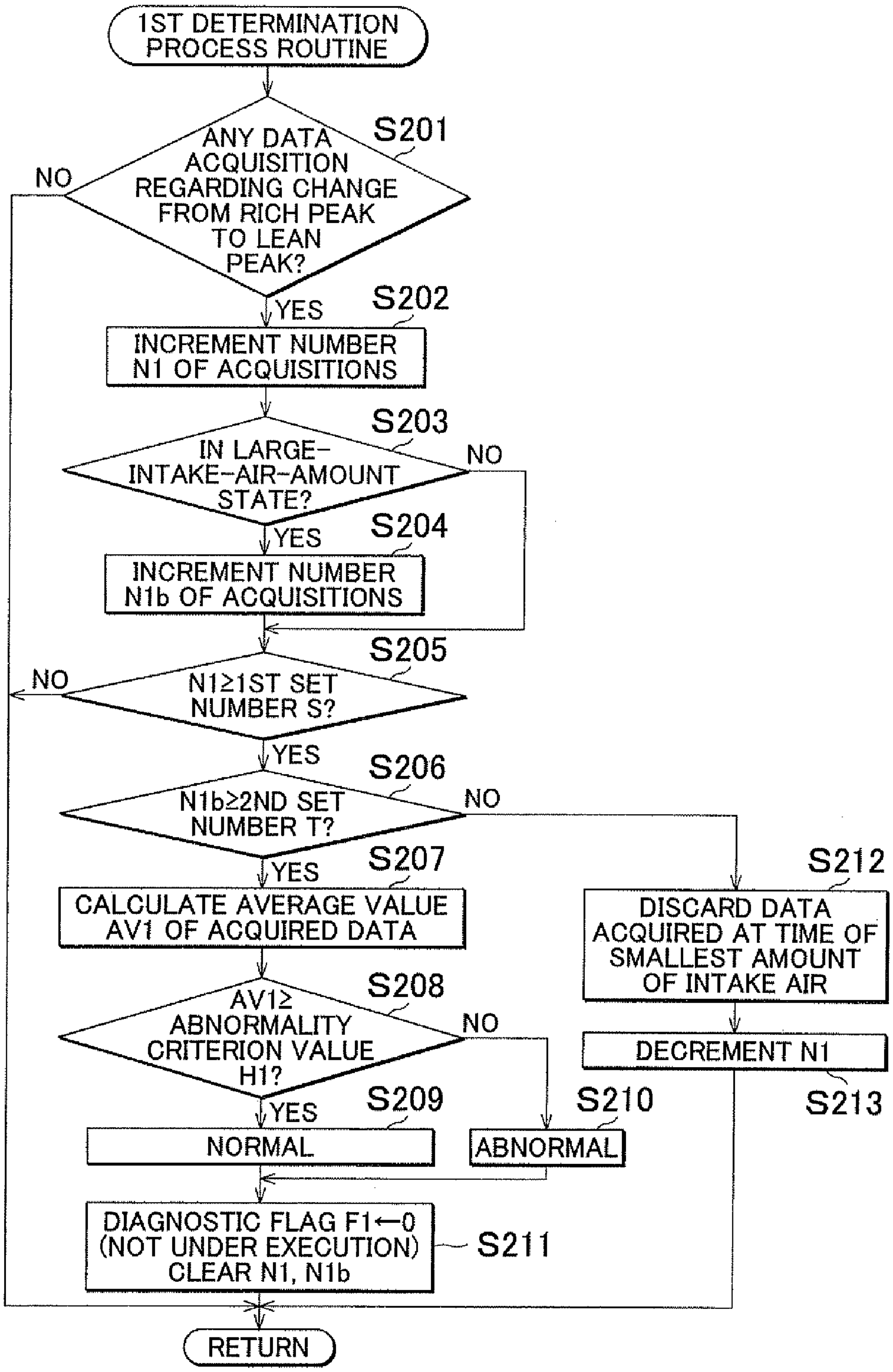
FIG. 7 is a flowchart showing an execution procedure of a first determination process that is executed in a first embodiment of the invention.

Next, a detailed procedure for execution of the first determination process that is performed in step S107 in the abnormality detection routine will be described with reference to a flowchart of FIG. 7 which shows a first determination process routine. This first determination process routine is executed every time the process proceeds to step S107 in the abnormality detection routine.

In the first determination process routine, after the change of the output VAF of the air/fuel ratio sensor 26 from the rich peak to the lean peak is completed and the acquisition of data (maximum value θmax) regarding the change from the rich peak to the lean peak is performed (YES in S201), the number N1 of acquisitions is incremented by "1" (S202). After that, in order to determine whether or not the foregoing acquisition of data is the acquisition performed during the large-amount-of-intake-air state of the engine 1, it is determined whether or not the engine 1 is in the large-amount-of-intake-air state (S203), that is, it is determined whether or not the intake air amount of the engine 1 is greater than or equal to a predetermined value X1.

It is to be noted herein that as shown in FIG. 5, the smaller the intake air amount of the engine 1, the closer the region RA2 and the region RA3 are to each other in the vertical direction in the diagram of FIG. 5, and the smaller the distance between the region RA2 and the region RA3 in the vertical direction in the diagram of FIG. 5 (the length of an arrowed line Y1). This means that when the intake air amount of the engine 1 is small, the foregoing data (maximum value θmax) comes to less clearly show a difference according to the presence/absence of abnormality of the air/fuel ratio sensor 26, and that the larger the intake air amount of the engine 1, the more conspicuously the data shows a difference according to the presence/absence of abnormality of the air/fuel ratio sensor 26. The predetermined value X1 adopted is a value that is determined beforehand by experiments or the like as a value that enables the affirmative determination in step S203 to represent the fact that the intake air amount of the engine 1 is such an amount that the foregoing data conspicuously shows a difference according to the presence/absence of abnormality of the air/fuel ratio sensor 26.

If an affirmative determination is made in step S203 (FIG. 7), it is determined that the foregoing acquisition of data is the acquisition performed during the large-amount-of-intake-air state of the engine 1, and the number N1*b* of acquisitions of data performed during the large-amount-of-intake-air state of the engine 1 is incremented by "1" (S204). On the other hand, if a negative determination is made in step S203, it is determined that the foregoing acquisition of data is not the acquisition performed during the large-amount-of-intake-air state of the engine 1, and the number N1*b* of acquisitions is not incremented. Therefore, the number N1*b* of acquisitions, of the number N1 of acquisitions, represents the number of times the acquisition of data has been performed during a state in which the intake air amount of the engine 1 is such a large amount that the data acquired during the state conspicuously shows an influence caused by the presence/absence of abnormality of the air/fuel ratio sensor 26.

Then, it is determined whether or not the number N1 of acquisitions is greater than or equal to the first set number S (e.g., five) (S205), and it is determined whether or not the number N1*b* of acquisitions is greater than or equal to the second set number T (e.g., one) that is less than the first set number S (S206).

If an affirmative determination is made in both step S205 and step S206, that means that, of at least the first set number S of acquisitions of the data, the number N1*b* of acquisitions of the data performed during the large-amount-of-intake-air state of the engine 1 is greater than or equal to the second set number T. In this case, the average value AV1 of the acquired data is found (S207), and the determination as to the presence/absence of abnormality of the air/fuel ratio sensor 26 is performed on the basis of the comparison between the average value AV1 and the abnormality criterion value H1. Specifically, if the average value AV1 is greater than or equal to the abnormality criterion value H1 (YES in S208), it is determined that the air/fuel ratio sensor 26 does not have abnormality during the change of the output VAF of the air/fuel ratio sensor 26 from the rich state to the lean state, and therefore that the air/fuel ratio sensor 26 is normal (S209). Besides, if the average value AV1 is less than abnormality criterion value H1 (NO in S208), it is determined that the air/fuel ratio sensor 26 has abnormality during the change of the output VAF of the air/fuel ratio sensor 26 from the rich state to the lean state (S210). After it is determined that the air/fuel ratio sensor 26 is normal or abnormal (S209 or S210), the diagnostic flag F1 is set to "0 (not under execution)", and the numbers N1, N1*b* of acquisitions are cleared to "0" (S211). Incidentally, the abnormality criterion value H1 adopted herein is a value that is determined beforehand through experiments or the like so as to be appropriate for determining the presence/absence of abnormality of the air/fuel ratio sensor 26.

On the other hand, if an affirmative determination is made in step S205 and a negative determination is made in step S206, that means that, of at least the first set number S of acquisitions of the data, the number N1*b* of acquisitions of the data performed during the large-amount-of-intake-air state of the engine 1 is less than the second set number T. In this case, the data acquired and stored into the RAM of the electronic control unit 19 at the time of the smallest amount of intake air of the engine 1 among the acquired data is deleted from the RAM, and is discarded (S212). After that, the number N1 of acquisitions is decremented by "1" (S213). Therefore, the foregoing acquisition of data can be continued.

Figure 8:
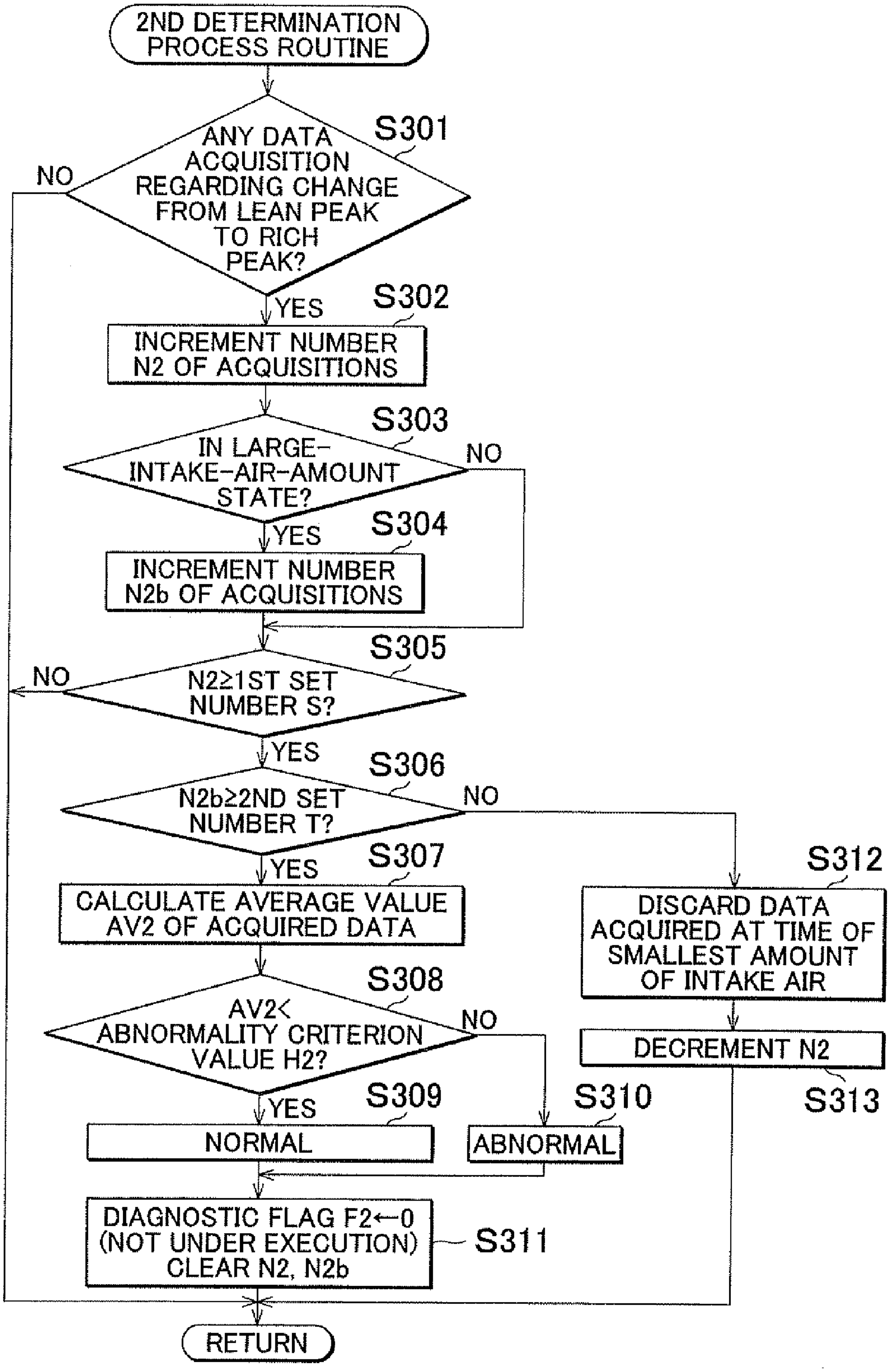
FIG. 8 is a flowchart showing an execution procedure of a second determination process that is executed in the first embodiment.

Next, a detailed execution procedure of the second determination process performed in step S108 of abnormality detection routine will be described with reference to a flowchart in FIG. 8 which shows a second determination process routine. This first determination process routine is executed every time the process proceeds to step S108 of the abnormality detection routine.

In the second determination process routine, after the change of the output VAF of the air/fuel ratio sensor 26 from the lean peak to the rich peak is completed and the acquisition of data (maximum value θmax) regarding the change from the lean peak to the rich peak is performed (YES in S301), the number N2 of acquisitions is incremented by "1" (S302). After that, in order to determine whether or not the foregoing acquisition of data is the acquisition performed during the large-amount-of-intake-air state of the engine 1, it is determined whether or not the engine 1 is in the large-amount-of-intake-air state (S303), that is, it is determined whether or not the intake air amount of the engine 1 is greater than or equal to a predetermined value X2.

It is to be noted herein that as shown in FIG. 6, the smaller the intake air amount of the engine 1, the closer the region RA5 and the region RA6 are to each other in the vertical direction in the diagram of FIG. 6, and the smaller the distance between the region RA5 and the region RA6 in the vertical direction in the diagram of FIG. 6 (the length of an arrowed line Y2). This means that when the intake air amount of the engine 1 is small, the foregoing data (maximum value θmax) comes to less clearly show a difference according to the presence/absence of abnormality of the air/fuel ratio sensor 26, and that the larger the intake air amount of the engine 1, the more conspicuously the data shows a difference according to the presence/absence of abnormality of the air/fuel ratio sensor 26. The predetermined value X2 adopted is a value that is determined beforehand by experiments or the like as a value that enables the affirmative determination in step S303 to represent the fact that the intake air amount of the engine 1 is such an amount that the foregoing data conspicuously shows a difference according to the presence/absence of abnormality of the air/fuel ratio sensor 26.

If an affirmative determination is made in step S303, it is determined that the foregoing acquisition of data is the acquisition performed during the large-amount-of-intake-air state of the engine 1, and the number N2*b* of acquisitions of the data performed during the large-amount-of-intake-air state of the engine 1 is incremented by "1" (S304). On the other hand, if a negative determination is made in step S303, it is determined that the foregoing acquisition of data is not the acquisition performed during the large-amount-of-intake-air state of the engine 1, and the number N2*b* of acquisitions is not incremented. Therefore, the number N2*b* of acquisitions, of the number N2 of acquisitions, represents the number of times the acquisition of data has been performed during a state in which the intake air amount of the engine 1 is such a large amount that the data acquired during the state conspicuously shows an influence caused by the presence/absence of abnormality of the air/fuel ratio sensor 26.

Then, it is determined whether or not the number N2 of acquisitions is greater than or equal to the first set number S (e.g., five) (S305), and it is determined whether or not the number N2*b* of acquisitions is greater than or equal to the second set number T (e.g., one) that is less than the first set number S (S306).

If an affirmative determination is made in both step S305 and step S306, that means that, of at least the first set number S of acquisitions of the data, the number N2*b* of acquisitions of the data performed during the large-amount-of-intake-air state of the engine 1 is greater than or equal to the second set number T. In this case, the average value AV2 of the acquired data is found (S307), and the determination as to the presence/absence of abnormality of the air/fuel ratio sensor 26 is performed on the basis of the comparison between the average value AV1 and the abnormality criterion value H2. Specifically, if the average value AV2 is less than or equal to the abnormality criterion value H2 (YES in S308), it is determined that the air/fuel ratio sensor 26 does not have abnormality during the change of the output VAF of the air/fuel ratio sensor 26 from the lean state to the rich state, and therefore that the air/fuel ratio sensor 26 is normal (S309). Besides, if the average value AV2 is greater than or equal to the abnormality criterion value H2 (NO in S308), it is determined that the air/fuel ratio sensor 26 has abnormality during the change of the output VAF of the air/fuel ratio sensor 26 from the lean state to the rich state (S310). After it is determined that the air/fuel ratio sensor 26 is normal or abnormal (S309 or S310), the diagnostic flag F2 is set to "0 (not under execution)", and the numbers N2, N2*b* of acquisitions are cleared to "0" (S311). Incidentally, the abnormality criterion value H2 adopted herein is a value that is determined beforehand through experiments or the like so as to be appropriate for determining the presence/absence of abnormality of the air/fuel ratio sensor 26.

On the other hand, if an affirmative determination is made in step S305 and a negative determination is made in step S306, that means that, of at least the first set number S of acquisitions of the data, the number N2*b* of acquisitions of the data performed during the large-amount-of-intake-air state of the engine 1 is less than the second set number T. In this case, the data acquired and stored into the RAM of the electronic control unit 19 at the time of the smallest amount of intake air of the engine 1 among the acquired data is deleted from the RAM, and is discarded (S312). After that, the number N2 of acquisitions is decremented by "1" (S313). Therefore, the foregoing acquisition of data can be continued.

According to the embodiment described above in detail, the following effects are obtained. A first effect will be described. In the abnormality detection process based on the procedure "a" to "c", the average values AV1 and AV2 used in the first and second determination processes in the process "c" are determined from high-reliability data that include data that are acquired at least the second set number T of times during the large-amount-of-intake-air state of the engine 1. Since the average values AV1 and AV2 are found using such high-reliability data, the determination as to the presence/absence of abnormality of air/fuel ratio sensor 26 based on comparison between the average values AV1 and AV2 and the abnormality criterion values becomes accurate.

With regard to execution of the determination as to the presence/absence of abnormality of the air/fuel ratio sensor 26 based on the procedure "a" to "c", the number N2*b* of acquisitions being greater than or equal to the second set number T becomes a condition. Although this condition is used as a condition for execution of the determination as to the presence/absence of abnormality of the air/fuel ratio sensor 26, the opportunities of executing the determination as to the presence/absence of abnormality of the air/fuel ratio sensor 26 are more in this case than in the case where a condition that the engine 1 is in the large-amount-of-intake-air state when data is acquired by the process "b" is added as an execution condition. Therefore, it becomes possible to restrain the reduction of the opportunities of executing the determination while accurately performing the determination as to the presence/absence of abnormality of the air/fuel ratio sensor 26.

Next, a second effect will be described. While the acquisition of data is continued until the numbers N1*b* and N2*b* of acquisitions become equal to or greater than the second set number T, the data acquired at the time of the smallest amount of intake air of the engine 1 among the acquired data is discarded, and then new data is acquired. Therefore, the data for use for finding the average values AV1 and AV2 are data acquired at the times of as large an amount of intake air of the engine as possible. As a result, the average values AV1 and AV2 become highly reliable, making it possible to make accurate determination as to the presence/absence of abnormality of the air/fuel ratio sensor 26 based on comparison between the average values AV1 and AV2 and the abnormality criterion values H1 and H2.

Next, a third effect will be described. By the first determination process, the presence/absence of abnormality of the air/fuel ratio sensor 26 during the change of the output VAF of the air/fuel ratio sensor 26 from the rich state to the lean state is determined on the basis of comparison between the abnormality criterion value H1 and the average value AV1 of the data acquired regarding the change of the output VAF of the air/fuel ratio sensor 26 from the rich peak to the lean peak. Besides, by the second determination process, the presence/absence of abnormality of the air/fuel ratio sensor 26 during the change of the output VAF of the air/fuel ratio sensor 26 from the lean state to the rich state is determined on the basis of comparison between the abnormality criterion value H2 and the average value AV2 of the data acquired regarding the change of the output VAF of the air/fuel ratio sensor 26 from the lean peak to the rich peak. Therefore, regardless of whether there occurs an abnormality during the change of the output VAF of the air/fuel ratio sensor 26 from the rich state to the lean state or an abnormality during the change of the output VAF from the lean state to the rich state, it is possible to precisely determine that the abnormality is present.

Besides, in the case where only one of the foregoing two kinds of abnormalities has occurred, it is inevitable that when the air/fuel ratio of the engine 1 is controlled to the stoichiometric air/fuel ratio through an air/fuel ratio feedback correction based on the output VAF of the air/fuel ratio sensor 26, the center of the fluctuations of the air/fuel ratio of the engine 1 associated with the control of the engine 1 to the stoichiometric air/fuel ratio deviates from the stoichiometric air/fuel ratio. As a result, it sometimes happens that good performance of exhaust gas purification of the exhaust purification catalyst provided in the exhaust passageway 4 of the engine 1 cannot be maintained and therefore the exhaust gas emission of the engine 1 deteriorates. However, in the embodiment, since it can be determined that abnormality has occurred even in the case where only one of the two kinds of abnormalities has occurred as described above, it is possible to restrain the foregoing deterioration of the exhaust gas emission by coping with the abnormality on the basis of the determination of the occurrence of the abnormality.

Figure 9:
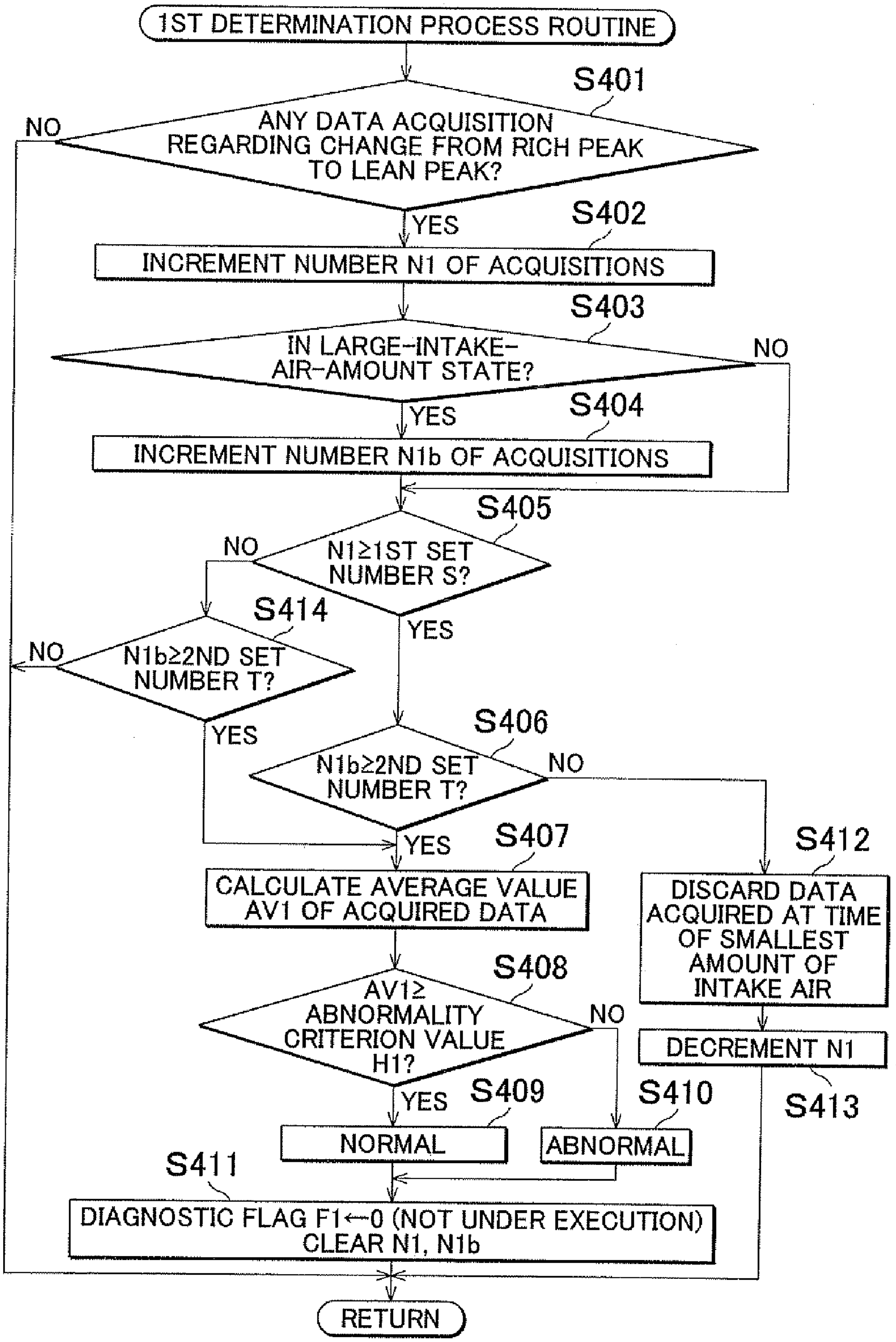
FIG. 9 is a flowchart showing an execution procedure of the first determination process that is executed in a second embodiment of the invention.
Figure 10:
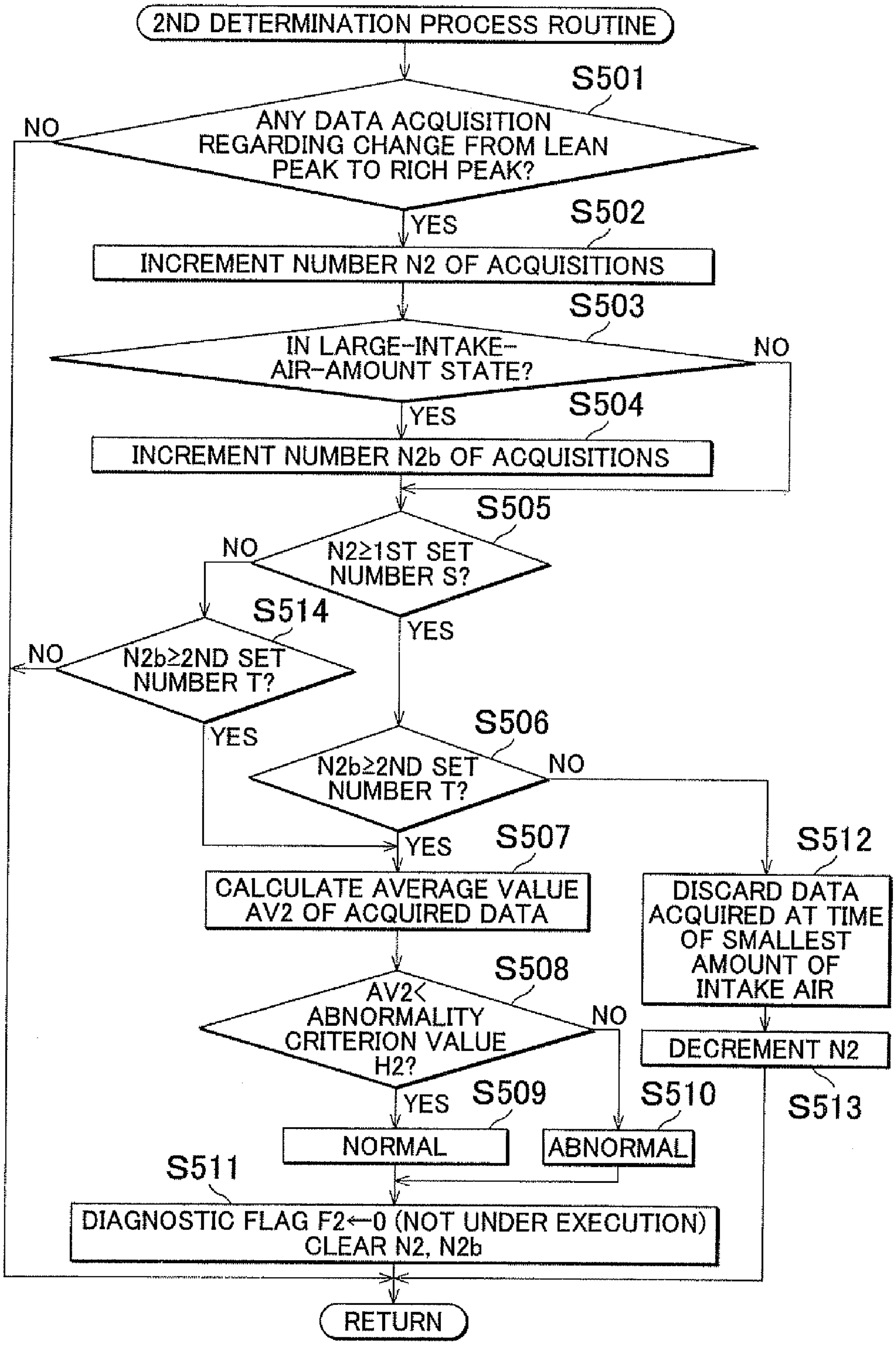
FIG. 10 is a flowchart showing an execution procedure of the second determination process that is executed in the second embodiment of the invention.

Next, a second embodiment of the invention will be described with reference to FIG. 9 and FIG. 10. FIG. 9 is a flowchart showing a first determination process routine of this embodiment, and FIG. 10 is a flowchart showing a second determination process routine of the embodiment. Incidentally, in this embodiment, as in the first embodiment, the process from step S101 to step S106 shown in FIG. 4 is executed, and the first determination process routine shown in FIG. 9 is executed as the first determination process of step S107, and the second determination process routine shown in FIG. 10 is executed as the second determination process of step S108. In the first determination process routine, the process of steps S401 to S413 that is the same as the process of steps S201 to S213 in the first determination process routine (FIG. 7) of the first embodiment is performed; and in addition, the process of step S414 is performed. Due to this, even if the number N1 of acquisitions of data is less than the first set number S, the determination as to the presence/absence of abnormality of the air/fuel ratio sensor 26 based on comparison between the average value AV1 of the acquired data and the abnormality criterion value H1 is executed provided that the number N1*b* of acquisitions which is the number of times the acquisition of data at the time of large amount of intake air of the engine has been performed is greater than or equal to the second set number T.

Specifically, through the process of steps S401 to S404, the numbers N1 and N1*b* of acquisitions are counted, and in step S405 it is determined whether or not the number N1 of acquisitions is greater than or equal to the first set number S. If a negative determination is made in step S405, it is determined that the number N1 of acquisitions is less than the first set number 5, and the process proceeds to step S414. In step S414, it is determined whether or not the number N1*b* of acquisitions is greater than or equal to the second set number T. If an affirmative determination is made in step S414, that means that even though the number N1 of acquisitions is less than the first set number 5, the number N1*b* of acquisitions is greater than or equal to the second set number T. Then, in such a situation, too, through the process of steps S407 to S410, the average value AV1 of the data acquired up to that time is found, and the presence/absence of abnormality of the air/fuel ratio sensor 26 during the change of the output VAF of the air/fuel ratio sensor 26 from the rich state to the lean state is determined on the basis of comparison between the average value AV1 and the abnormality criterion value H1.

In the second determination process routine shown in FIG. 10, the process of steps S501 to S513 that is the same as the process of steps S301 to S313 in the second determination process routine (FIG. 8) of the first embodiment is performed, and in addition, the process of step S514 is also performed. Due to this, even if the number N2 of acquisitions of data is less than the first set number S, the determination as to the presence/absence of abnormality of the air/fuel ratio sensor 26 based on comparison between the average value AV2 of the acquired data and the abnormality criterion value H2 is executed provided that the number N2*b* of acquisitions which is the number of times the acquisition of data at the time of large amount of intake air of the engine has been performed is greater than or equal to the second set number T.

Specifically, through the process of steps S501 to S504, the numbers N2 and N2*b* of acquisitions are counted, and in step S505 it is determined whether or not the number N2 of acquisitions is greater than or equal to the first set number S. If a negative determination is made in step S505, it is determined that the number N2 of acquisitions is less than the first set number S, and the process proceeds to step S514. In step S514, it is determined whether or not the number N2*b* of acquisitions is greater than or equal to the second set number T. If an affirmative determination is made in step S514, that means that even though the number N2 of acquisitions is less than the first set number S, the number N2*b* of acquisitions is greater than or equal to the second set number T. Then, in such a situation, too, through the process of steps S507 to S510, the average value AV2 of the data acquired up to that time is found, and the presence/absence of abnormality of the air/fuel ratio sensor 26 during the change of the output VAF of the air/fuel ratio sensor 26 from the lean state to the rich state is determined on the basis of comparison between the average value AV2 and the abnormality criterion value H2.

According to this embodiment, while the three effects stated above in conjunction with the first embodiment are obtained, a fourth effect shown below is obtained. The fourth effect is that because when the numbers N1*b* and N2*b* of acquisitions become equal to or greater than the second set number T, the determination as to the presence/absence of abnormality of the air/fuel ratio sensor 26 based on comparison between the average values AV1 and AV2 of the acquired data and the abnormality criterion values H1 and H2 is executed regardless of whether or not the numbers N1 and N2 of acquisitions are less than the first set number S, the determination can be performed early and at high frequency.

Figure 11A:
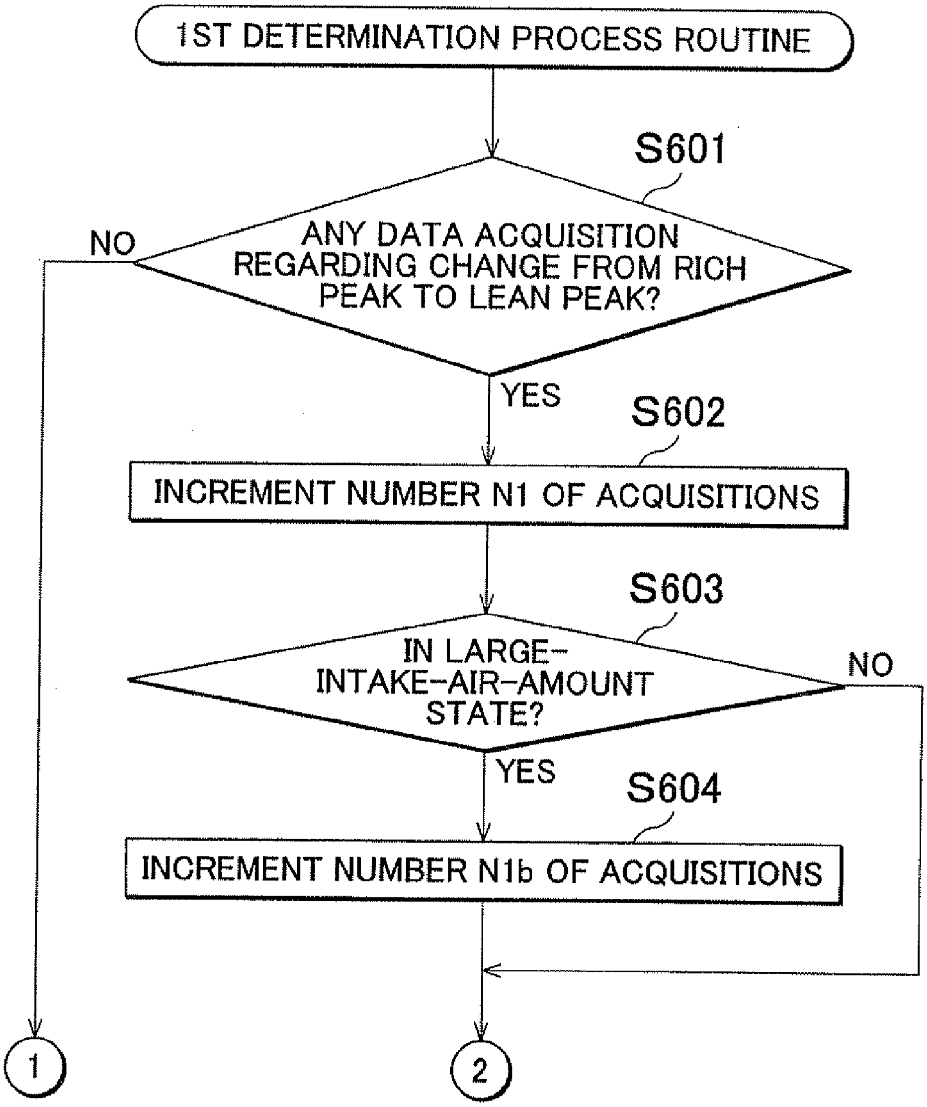
FIG. 11A, B is a flowchart showing an execution procedure of the first determination process that is executed in a third embodiment of the invention.
Figure 11B:
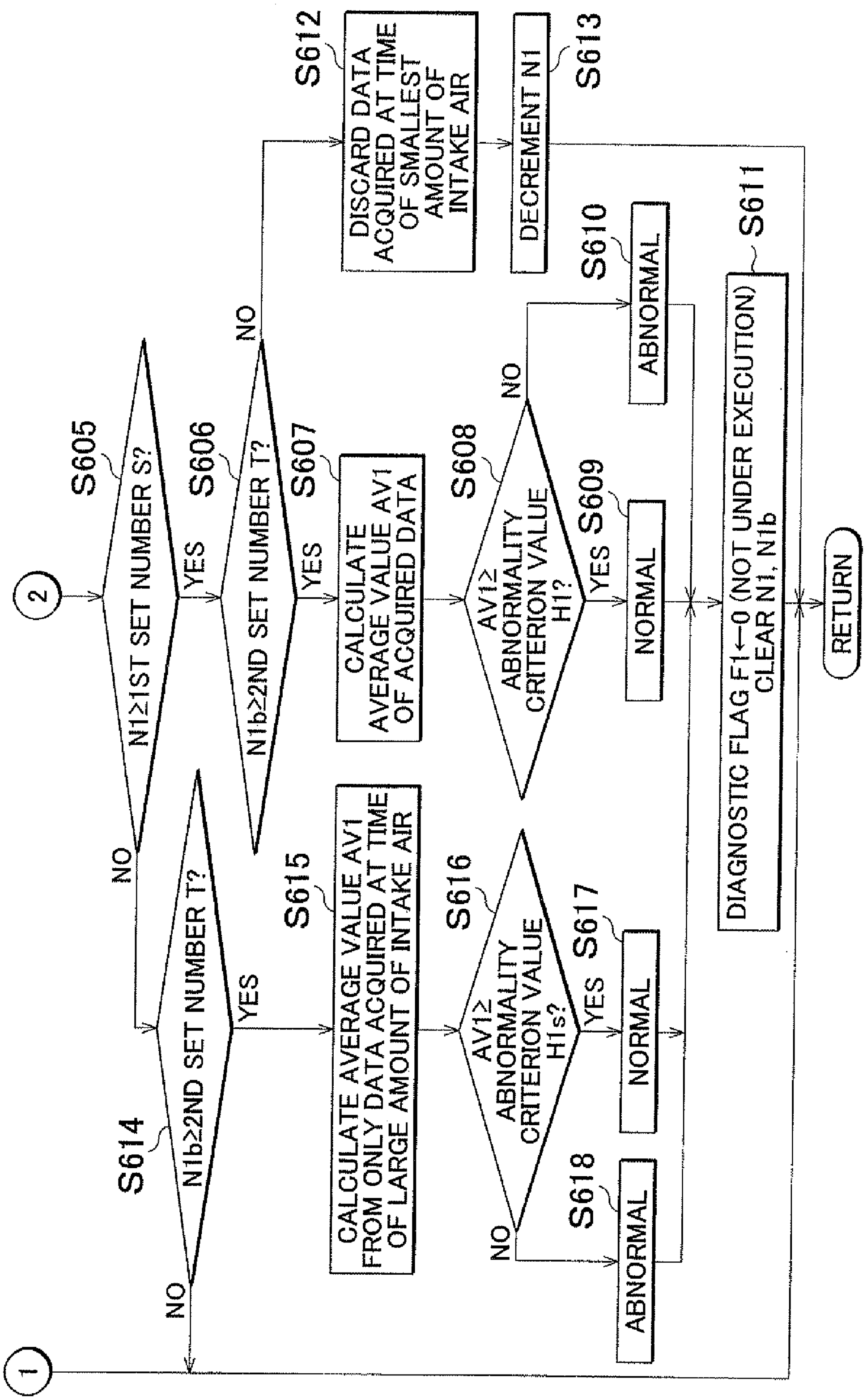
Figure 12A:
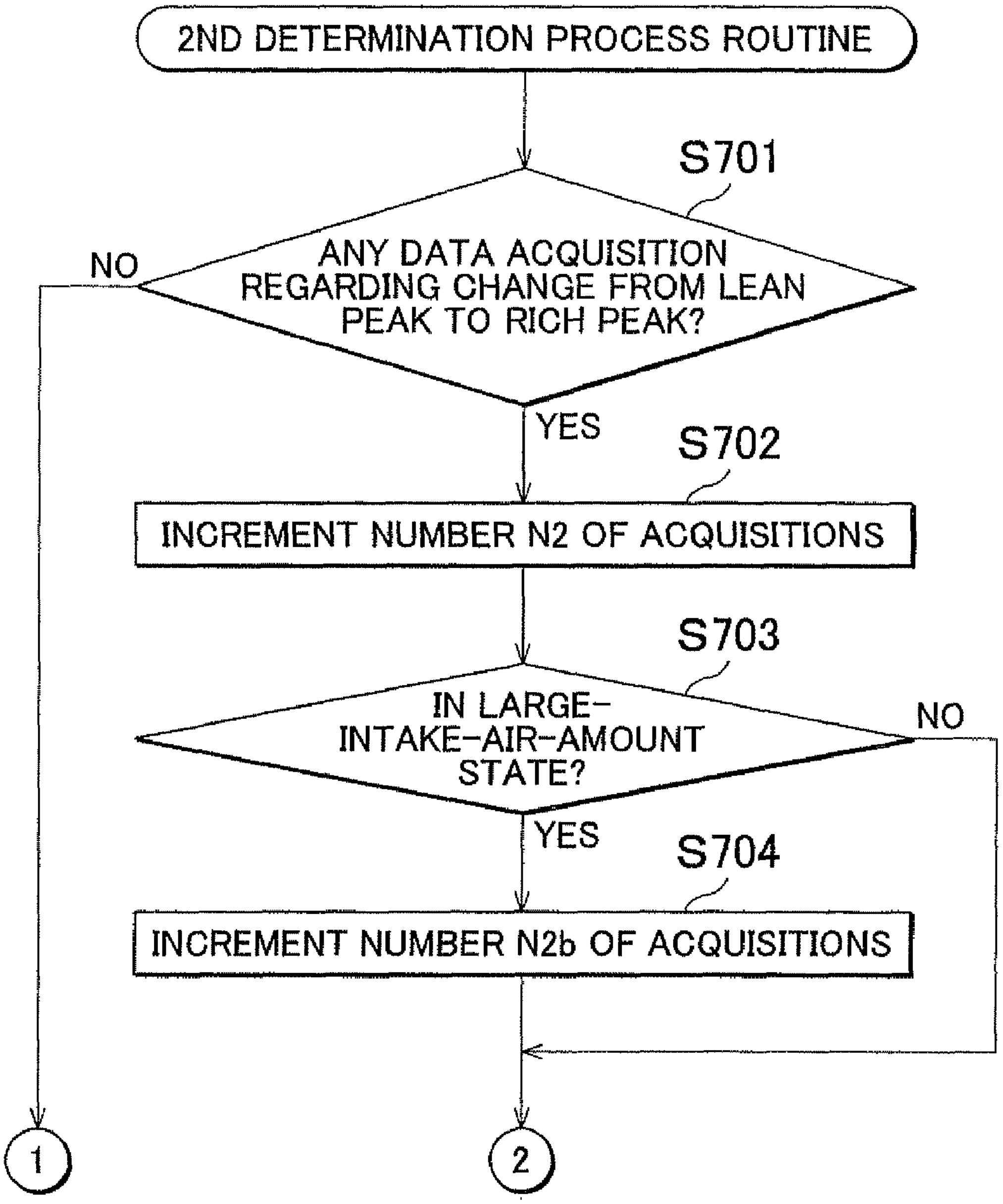
FIG. 12A, B is a flowchart showing an execution procedure of the second determination process that is executed in the third embodiment of the invention.

Next, a third embodiment of the invention will be described with reference to FIG. 11A, B and FIG. 12A, B. FIG. 11A, B is a flowchart showing a first determination process of this embodiment, and FIG. 12 A, B is a flowchart showing a second determination process routine of this embodiment. Incidentally, in this embodiment, as in the first embodiment, the process from step S101 to step S106 shown in FIG. 4 is executed, and the first determination process routine shown in FIG. 11A, B is executed as the first determination process of step S107, and the second determination process routine shown in FIG. 12 A, B is executed as the second determination process of step S108. In the first determination process routine, the process of steps S601 to S614 that is the same as the process of steps S401 to S414 in the first determination process routine (FIG. 9) of the second embodiment is performed, and in addition, the process of steps S615 to S618 is also performed. That is, if it is determined that the number N1 of acquisitions that is counted through the process (S601 to S604) of counting the numbers N1 and N1*b* of acquisitions is less than the first set number S (NO in S605) and it is determined that the number N1 of acquisitions is greater than or equal to the second set number T (YES in S614), then the process of steps S615 to S618 is performed.

In this series of processes, the average value AV1 is found from only the data acquired at the time of large amount of intake air of the engine 1 (S615), and the determination as to the presence/absence of abnormality of the air/fuel ratio sensor 26 is performed on the basis of comparison between the average value AV1 and an abnormality criterion value H1*s* that is prepared for use for comparison with the average value AV1, separately from the abnormality criterion value H1 (S616 to S618). That is, if the average value AV1 is greater than or equal to abnormality criterion value H1*s* (YES in S616), it is determined that there is no abnormality of the air/fuel ratio sensor 26 occurring during the change of the output VAF of the air/fuel ratio sensor 26 from the rich state to the lean state, and therefore that the air/fuel ratio sensor 26 is normal (S617). Besides, if the average value AV1 is less than the abnormality criterion value H1*s* (NO in S616), it is determined that abnormality of the air/fuel ratio sensor 26 occurs during the change of the output VAF of the air/fuel ratio sensor 26 from the lean state to the rich state (S618). Incidentally, the abnormality criterion value H1*s* used herein is a value that is determined beforehand through experiments or the like so as to be an optimum value for determining the presence/absence of the abnormality of the air/fuel ratio sensor 26 on the basis of the average value AV1.

Figure 12B:
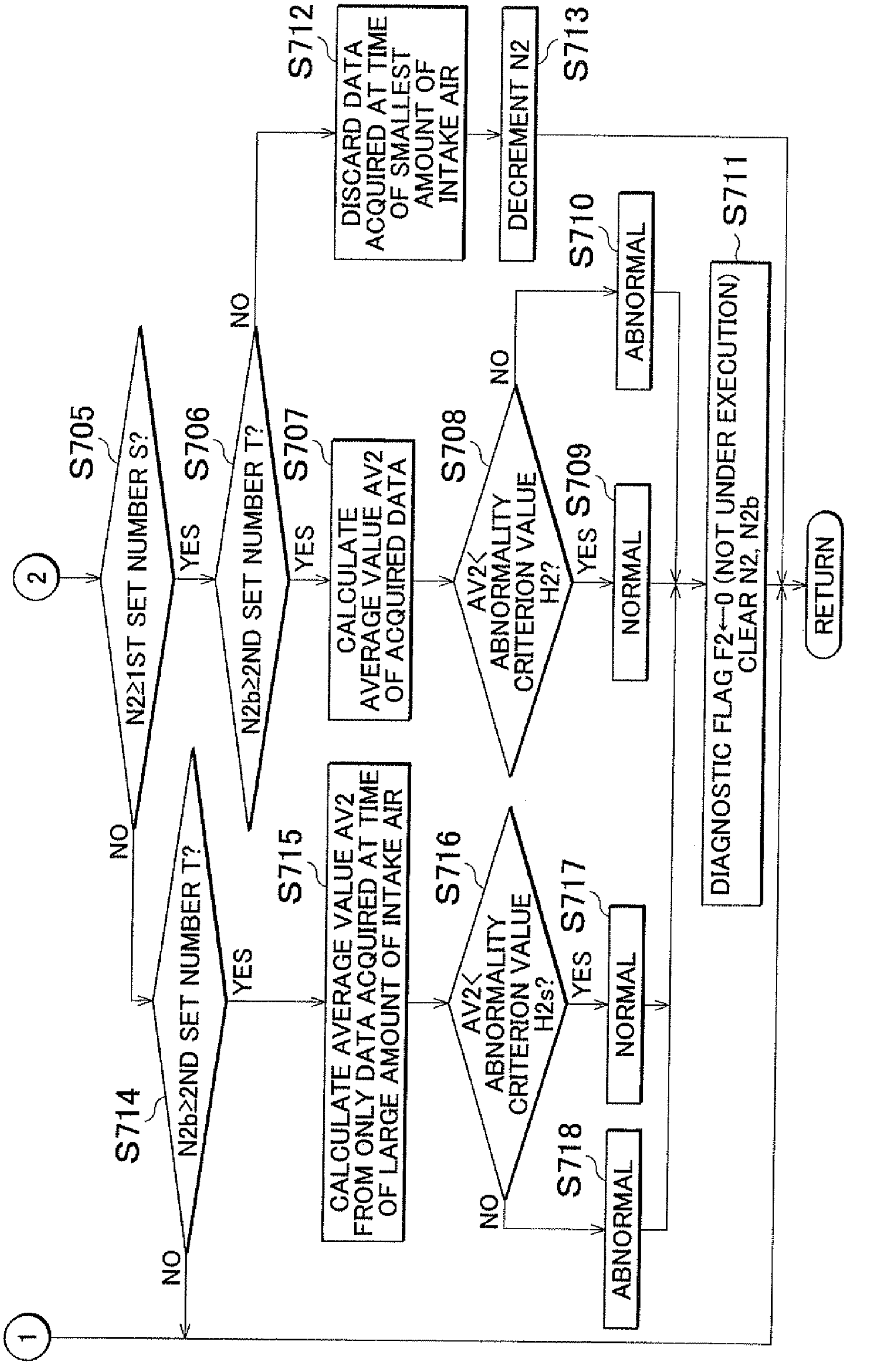

In the second determination process shown in FIG. 12 A, B, the process of steps S701 to S714 that is the same as the process of steps S501 to S514 in the second determination process routine (FIG. 10) of the second embodiment is performed, and in addition, the process of steps S715 to S718 is performed. That is, if it is determined that the number N2 of acquisitions that is counted through the process (S701 to S704) of counting the numbers N2 and N2*b* of acquisitions is less than the first set number S (NO in S705) and it is determined that the number N2 of acquisitions is greater than or equal to the second set number T (YES in S714), then the process of steps S715 to S718 is performed.

In this series of processes, the average value AV2 is found from only the data acquired at the time of large amount of intake air of the engine 1 (S715), and the determination as to the presence/absence of abnormality of the air/fuel ratio sensor 26 is performed on the basis of comparison between the average value AV2 and an abnormality criterion value H2*s* that is prepared for use for comparison with the average value AV2, separately from the abnormality criterion value H2 (S716 to S718). That is, if the average value AV2 is less than or equal to abnormality criterion value H2*s* (YES in S716), it is determined that there is no abnormality of the air/fuel ratio sensor 26 occurring during the change of the output VAF of the air/fuel ratio sensor 26 from the lean state to the rich state, and therefore that the air/fuel ratio sensor 26 is normal (S717). Besides, if the average value AV2 is greater than the abnormality criterion value H2*s* (NO in S716), it is determined that abnormality of the air/fuel ratio sensor 26 occurs during the change of the output VAF of the air/fuel ratio sensor 26 from the lean state to the rich state (S718). Incidentally, the abnormality criterion value H2*s* used herein is a value that is determined beforehand through experiments or the like so as to be an optimum value for determining the presence/absence of the abnormality of the air/fuel ratio sensor 26 on the basis of the average value AV2.

According to this embodiment, while the four effects described above in conjunction with the first and second embodiments are obtained, a fifth effect shown below is obtained. The fifth effect will be described. When the presence/absence of abnormality of the air/fuel ratio sensor 26 is determined on the basis of the numbers N1*b* and N2*b* of acquisitions of data becoming equal to or greater than the second set number T while the numbers N1 and N2 of acquisitions are less than the first set number S, the average values AV1 and AV2 used on this occasion are average values of only the data acquired at the time of large amount of intake air of the engine 1 (the data corresponding to the numbers N1*b* and N2*b* of acquisitions).

The data acquired during the large-amount-of-intake-air state of the engine 1 is highly reliable data that precisely represents the influence of an abnormality of the air/fuel ratio sensor 26 if any occurs. This is because during the large-amount-of-intake-air state of the engine 1, the amount of flow of exhaust gas also becomes large in association with the large intake air amount, and the influence caused by abnormality of the air/fuel ratio sensor 26 is more likely to appear in the output VAF of the sensor 26. Since the average values AV1 and AV2 are found by using only such highly reliable data, the determination as to the presence/absence of abnormality of the air/fuel ratio sensor 26 through the use of the average values AV1 and AV2 becomes accurate.

Besides, as for the abnormality criterion values for use for determination as to the presence/absence of abnormality of the air/fuel ratio sensor 26, the abnormality criterion values H1*s* and H2*s* prepared separately from the ordinary values (H1 and H2) are used as values that correspond to the average values AV1 and AV2 that are found from only the data acquired at the time of large amount of intake air of the engine 1. It is to be noted herein that while the average values AV1 and AV2 found from only the data acquired at the time of large amount of intake air of the engine 1 are different from the average values that are found in a usual manner, and are more reliable than the average values that are found in the usual manner, the abnormality criterion values H1*s* and H2*s* can be accordingly caused to be appropriate values that correspond to the average values AV1 and AV2 that are found from only the data acquired at the time of large amount of intake air of the engine 1. Therefore, in the case where the average values AV1 and AV2 have been found from only the data acquired at the time of large amount of intake air of the engine 1, the results of the determination as to the presence/absence of abnormality of the air/fuel ratio sensor 26 through the use of the average values AV1 and AV2 can be made accurate.

Incidentally, the foregoing embodiments may also be modified, for example, in the following manners. In the first to third embodiments, the determination as to the presence/absence of an abnormality that occurs during the change of the output VAF of the air/fuel ratio sensor 26 from the rich state to the lean state and the determination as to the presence/absence of an abnormality that occurs during the change of the output VAF from the lean state to the rich state are performed separately from each other. However, it is not altogether necessary to adopt this manner of determination as to the presence/absence of abnormality. For example, the absolute value of the amount of change of the output VAF per unit time during the active air/fuel ratio control may be acquired as data of the responsiveness parameter, and the presence/absence of abnormality of the air/fuel ratio sensor 26 may be determined on the basis of the data. In this case, the presence/absence of abnormality of the air/fuel ratio sensor 26 is determined regardless of the direction of change of the output VAF of the air/fuel ratio sensor 26.

In first to third embodiments, the values of the first set number S and the second set number T may also be appropriately changed. Incidentally, it is preferable that the second set number T be one as in the first to third embodiments, and it is also possible to set two, three, fourth, etc., as the second set number T.

Besides, in the first to third embodiments, the second set number T may be a variable value based on the numbers N1 and N2 of acquisitions, the process (S212, S312, S412, S512, S612 and S712) regarding the discard of acquired data, and the process (S213, S313, S413, S513, S613, S713) regarding the decrement of the numbers N1 and N2 of acquisitions may be caused to not be performed. In this case, as for the manner of varying the second set number T, it is conceivable to vary the second set number T, for example, as follows. That is, the second set number T that is used in the first determination process is set on the basis of the expression "T=N1×0.2" so that second set number T becomes equal to 20% of the number N1 of acquisitions, and the second set number T that is used in the second determination process is set on the basis of the "T=N2×0.2" so that the second set number T becomes equal to 20% of the number N2 of acquisitions which is obtained during the second determination process. Incidentally, the value "0.2" in the foregoing expression represents the proportion of the second set number T to the numbers N1 and N1 of acquisitions (hereinafter, referred to as "set proportion"). This set proportion may also be changed to a value other than "0.2" as appropriate, the manner of varying the second set number T to the change of the numbers N1 and N2 of acquisitions may also be changed.

Due to the second set number T being made variable as described above, the second set number T increases as the numbers N1 and N2 of acquisitions increase. When the numbers N1*b* and N2*b* of acquisitions reach the second set number T, that means that the acquisition of data during the large-amount-of-intake-air state of the engine 1 has been performed a number of times that corresponds to the set proportion, among the numbers N1 and N2 of acquisitions. Then, the determination as to the presence/absence of abnormality of the air/fuel ratio sensor 26 based on comparison between the average values of the acquired data and the abnormality criterion values is performed. In this case, it becomes possible to omit the discard of acquired data, and calculate average values using all the acquired data, and perform the determination as to the presence/absence of abnormality of the air/fuel ratio sensor 26 on the basis of comparison between the average values and the abnormality criterion values. Due to this, a large number of data for finding the average values can be secured, and the found average values can be caused to be appropriate values based on many data, as the value for use for the determination as to the presence/absence of abnormality of the air/fuel ratio sensor 26. Incidentally, in the case where the second set number T is variable as described above, there is possibility of the second set number T becoming greater than the first set number S due to increases of the numbers N1 and N2 of acquisitions.

In the first to third embodiments, a locus length ΣS between the rich peak and the lean peak of the output VAF of the air/fuel ratio sensor 26 may also be used as a responsiveness parameter that is found during the active air/fuel ratio control. Incidentally, the locus length ΣS is an integrated value of the changes of the output VAF of the air/fuel ratio sensor 26 at every predetermined time between the rich peak and the lean peak of the output VAF of the air/fuel ratio sensor 26. As for the responsiveness parameter, the use of the maximum value θmax of the gradient θ as in the first to third embodiments is more preferable than the use of the locus length ΣS. This is because, compared with the locus length ΣS, the maximum value θmax of the gradient θ is less subject to the influence caused by the external disturbance, such as change in the accelerator pedal depression amount, or the like, and makes it easier to distinguish normality and abnormality of the air/fuel ratio sensor 26 on the basis of comparison with the abnormality criterion values.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. An abnormality detection apparatus for an air/fuel ratio sensor that outputs a signal that corresponds to air/fuel ratio of an internal combustion engine based on oxygen concentration in exhaust gas of the internal combustion engine, comprising:

an air/fuel ratio control portion that performs an active air/fuel ratio control of periodically fluctuating the air/fuel ratio of the internal combustion engine between a rich state and a lean state;

a data acquisition portion that acquires, as data for detecting abnormality, a parameter that corresponds to responsiveness during change of output of the air/fuel ratio sensor between a rich peak and a lean peak during the active air/fuel ratio control performed by the air/fuel ratio control portion; and an abnormality determination portion that determines presence/absence of abnormality of the air/fuel ratio sensor based on comparison between an abnormality criterion value and an average value of the data that have been obtained by performing acquisition of the data via the data acquisition portion a plurality of times, wherein:

when the number of times the data has been acquired by the data acquisition portion becomes equal to or greater than a first set number, the abnormality determination portion executes determination as to the presence/absence of abnormality if the number of times the acquisition of the data at a time of large amount of intake air of the internal combustion engine has been performed by the data acquisition portion is greater than or equal to a second set number; and when the number of times the data has been acquired by the data acquisition portion becomes equal to or greater than a first set number, if the number of times the acquisition of the data at the time of large amount of intake air of the internal combustion engine has been performed by the data acquisition portion is less than the second set number, the abnormality determination portion does not execute the determination as to the presence/absence of abnormality, but continues to acquire the data until the number of times the data has been acquired by the data acquisition portion at the time of large amount of intake air of the internal combustion engine reaches the second set number.

2. The abnormality detection apparatus according to claim 1, wherein when the number of times the data has been acquired becomes equal to or greater than the first set number, if the number of times the data has been acquired at the time of large amount of intake air of the internal combustion engine is less than the second set number, the data acquired at a time of a smallest amount of intake air of the internal combustion engine among all the data acquired is discarded, and the data continues to be acquired.

3. The abnormality detection apparatus according to claim 1, wherein the second set number is a number obtained by multiplying the number of times the data has been acquired by a set proportion that is determined beforehand.

4. The abnormality detection apparatus according to claim 3, wherein the set proportion that is determined beforehand is 0.2.

5. The abnormality detection apparatus according to claim 1, wherein if the number of times the data has been acquired at the time of large amount of intake air of the internal combustion engine is greater than or equal to the second set number even though the number of times the data has been acquired is less than the first set number, the determination as to the presence/absence of abnormality of the air/fuel ratio sensor based on the comparison between the average value of the acquired data and the abnormality criterion value is executed.

6. The abnormality detection apparatus according to claim 5, wherein when the number of times the data has been acquired at the time of large amount of intake air of the internal combustion engine becomes equal to or greater than the second set number while the number of times the data has been acquired is less than the first set number, the determination as to the presence/absence of abnormality of the air/fuel ratio sensor is performed based on comparison between the average value of only the data acquired at the time of large amount of intake air of the internal combustion engine and a second abnormality criterion value that is prepared separately from the abnormality criterion value.

7. The abnormality detection apparatus according to claim 1, wherein:

the acquisition of the data is divided into acquisition performed regarding the change of the output of the air/fuel ratio sensor from the rich peak to the lean peak during the active air/fuel ratio control, and acquisition performed regarding the change of the output of the air/fuel ratio sensor from the lean peak to the rich peak during the active air/fuel ratio control, and the number of times the data has been acquired during the change from the rich peak to the lean peak and the number of times the data has been acquired during the change from the lean peak to the rich peak are separately counted; and the determination as to the presence/absence of abnormality of the air/fuel ratio sensor is performed based on comparison between the abnormality criterion value and the average value of the data acquired regarding the change of the output of the air/fuel ratio sensor from the rich peak to the lean peak during the active air/fuel ratio control, and is also performed based on comparison between the abnormality criterion value and the average value of the data acquired regarding the change of the output of the air/fuel ratio sensor from the lean peak to the rich peak during the active air/fuel ratio control.

8. An abnormality detection method for an air/fuel ratio sensor that outputs a signal that corresponds to air/fuel ratio of an internal combustion engine based on oxygen concentration in exhaust gas of the internal combustion engine, comprising:

performing an active air/fuel ratio control of periodically fluctuating the air/fuel ratio of the internal combustion engine between a rich state and a lean state;

acquiring, as data for detecting abnormality, a parameter that corresponds to responsiveness during change of output of the air/fuel ratio sensor between a rich peak and a lean peak during the active air/fuel ratio control performed; and determining presence/absence of abnormality of the air/fuel ratio sensor based on comparison between an abnormality criterion value and an average value of the data that have been obtained by performing acquisition of the data a plurality of times, wherein:

when the number of times the data has been acquired becomes equal to or greater than a first set number, determination as to the presence/absence of abnormality is executed if the number of times the acquisition of the data at a time of large amount of intake air of the internal combustion engine has been performed is greater than or equal to a second set number; and when the number of times the data has been acquired becomes equal to or greater than the first set number, if the number of times the acquisition of the data at the time of large amount of intake air of the internal combustion engine has been performed is less than the second set number, the determination as to the presence/absence of abnormality is not executed, but the data continues to be acquired until the number of times the data has been acquired at the time of large amount of intake air of the internal combustion engine reaches the second set number.

* * * * *